(12) United States Patent
Takamura

(10) Patent No.: US 12,405,383 B2
(45) Date of Patent: Sep. 2, 2025

(54) RANGING DEVICE

(71) Applicant: CANON KABUSHIKI KAISHA, Tokyo (JP)

(72) Inventor: Akihiro Takamura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 133 days.

(21) Appl. No.: 18/348,107

(22) Filed: Jul. 6, 2023

(65) Prior Publication Data

US 2024/0022831 A1  Jan. 18, 2024

(30) Foreign Application Priority Data

Jul. 13, 2022 (JP) ................. 2022-112260

(51) Int. Cl.
*G01S 17/931* (2020.01)
*G01S 7/4863* (2020.01)
(Continued)

(52) U.S. Cl.
CPC .......... *G01S 17/931* (2020.01); *G01S 7/4863* (2013.01); *G01S 7/4873* (2013.01); *G01S 17/10* (2013.01); *G01S 17/14* (2020.01); *G01S 17/32* (2013.01); *G01S 17/42* (2013.01); *G01S 17/894* (2020.01); *G06T 7/70* (2017.01); *G06V 10/141* (2022.01); *H04N 25/46* (2023.01)

(58) Field of Classification Search
CPC ..... H04N 25/46; G01S 7/4863; G01S 7/4873; G01S 17/10; G01S 17/14; G01S 17/32; G01S 17/42; G01S 17/894; G01S 17/931; G06T 7/70; G06V 10/141
See application file for complete search history.

(56) References Cited

U.S. PATENT DOCUMENTS 9,280,345 B2   3/2016 Takamura
2022/0057520 A1*  2/2022 Mahara ................. G01S 17/931
(Continued)

FOREIGN PATENT DOCUMENTS

JP   2020-112443 A   7/2020
JP   2021-50950 A    4/2021
JP   2021-103101 A   7/2021

*Primary Examiner* — Lin Ye
*Assistant Examiner* — Chriss S Yoder, III
(74) *Attorney, Agent, or Firm* — VENABLE LLP

(57) ABSTRACT

A ranging device includes: a binning processing unit configured to perform binning processing for one or more frequency distributions held in one or more frequency distribution generation units of frequency distribution generation units; a determination unit configured to determine whether a component of reflected light from an object is included in the frequency distribution subjected to the binning processing; a binning setting unit configured to change the number of the frequency distribution generation units to be subjected to the binning processing performed by the binning processing unit in accordance with a result of the determination by the determination unit; and a distance calculation unit configured to calculate a distance to the object based on a time interval corresponding to a reception time of the reflected light when the determination unit determines that a component of the reflected light is included in the frequency distribution subjected to the binning processing.

13 Claims, 18 Drawing Sheets

(51) Int. Cl.
  *G01S 7/487* (2006.01)
  *G01S 17/10* (2020.01)
  *G01S 17/14* (2020.01)
  *G01S 17/32* (2020.01)
  *G01S 17/42* (2006.01)
  *G01S 17/894* (2020.01)
  *G06T 7/70* (2017.01)
  *G06V 10/141* (2022.01)
  *H04N 25/46* (2023.01)

(56) References Cited

U.S. PATENT DOCUMENTS

2022/0075066 A1* 3/2022 Azuma ................ G01C 15/002
2022/0373659 A1* 11/2022 Hamamatsu .......... G01S 17/931
2024/0426983 A1* 12/2024 Oyakawa ................ G01S 17/10

* cited by examiner

FIG. 7

| | 0 | 1 | 2 | 3 |
|---|---|---|---|---|
| 0 | (0,0) | (1,0) | (2,0) | (3,0) |
| 1 | (0,1) | (1,1) | (2,1) | (3,1) |
| 2 | (0,2) | (1,2) | (2,2) | (3,2) |
| 3 | (0,3) | (1,3) | (2,3) | (3,3) |

FIG. 8

| | 0 | 1 | 2 | 3 |
|---|---|---|---|---|
| 0 | 1 | 1 | 0 | 1 |
| 1 | 1 | 1 | 0 | 1 |
| 2 | 0 | 0 | 1 | 1 |
| 3 | 0 | 0 | 1 | 1 |

FIG. 9

| | 0 | 1 | 2 | 3 |
|---|---|---|---|---|
| 0 | 20m | 20m | ∞ | 20m |
| 1 | 20m | 20m | ∞ | 20m |
| 2 | ∞ | ∞ | 20m | 20m |
| 3 | ∞ | ∞ | 20m | 20m |

FIG. 10

| | 0 | 1 | 2 | 3 |
|---|---|---|---|---|
| 0 | - | - | 1 | - |
| 1 | - | - | 1 | - |
| 2 | 0 | 1 | - | - |
| 3 | 0 | 1 | - | - |

RANGING DEVICE

BACKGROUND OF THE INVENTION

Field of the Invention

The present disclosure relates to a ranging device.

Description of the Related Art

Japanese Patent Application Laid-Open No. 2020-112443, Japanese Patent Application Laid-Open No. 2021-103101, and Japanese Patent Application Laid-Open No. 2021-050950 disclose a ranging device that measures a distance to an object by emitting light from a light emitting unit and receiving light including reflected light from the object by a light receiving element. The ranging device disclosed in Japanese Patent Application Laid-Open No. 2020-112443 may perform ranging such that the ranging condition is changed while an imaging frame is formed. Examples of the ranging conditions include the number of avalanche photodiodes and sampling frequency.

However, in the technique disclosed in Japanese Patent Application Laid-Open No. 2020-112443, it is necessary to take a time close to one frame period from the change of the ranging condition to the detection of reflected light by receiving light again. Therefore, it may be a problem that the delay time from the change of the ranging condition until the ranging is performed according to the changed ranging condition is large.

SUMMARY OF THE INVENTION

It is an object of the present disclosure to provide a ranging device capable of improving ranging accuracy while suppressing an increase in delay time.

According to a disclosure of the present specification, there is provided a ranging device including: a time counting unit configured to perform time counting; a plurality of light receiving units each configured to generate a signal including a pulse based on incident light and perform an operation of counting the pulse; a plurality of frequency distribution generation units arranged corresponding to the plurality of light receiving units and each configured to hold a frequency distribution including a light reception count value of the pulse acquired at predetermined time intervals in the time counting; a binning processing unit configured to perform binning processing for one or more frequency distributions held in one or more frequency distribution generation units of the plurality of frequency distribution generation units; a determination unit configured to determine whether a component of reflected light from an object is included in the frequency distribution subjected to the binning processing; a binning setting unit configured to change the number of the frequency distribution generation units to be subjected to the binning processing performed by the binning processing unit in accordance with a result of the determination by the determination unit; and a distance calculation unit configured to calculate a distance to the object based on a time interval corresponding to a reception time of the reflected light when the determination unit determines that a component of the reflected light is included in the frequency distribution subjected to the binning processing.

Further features of the present invention will become apparent from the following description of exemplary embodiments with reference to the attached drawings.

BRIEF DESCRIPTION OF THE DRAWINGS

FIG. 7 is a diagram illustrating coordinates of each pixel according to the first embodiment.

FIG. 8 is a diagram illustrating an example of an output of a determination unit where the number of binning pixels is 1×1 according to the first embodiment.

FIG. 9 is a diagram illustrating an example of an output of a distance calculation unit where the number of binning pixels is 1×1 according to the first embodiment.

FIG. 10 is a diagram illustrating an example of an output of the determination unit where the number of binning pixels is 2×1 according to the first embodiment.

DESCRIPTION OF THE EMBODIMENTS

Figure 1:
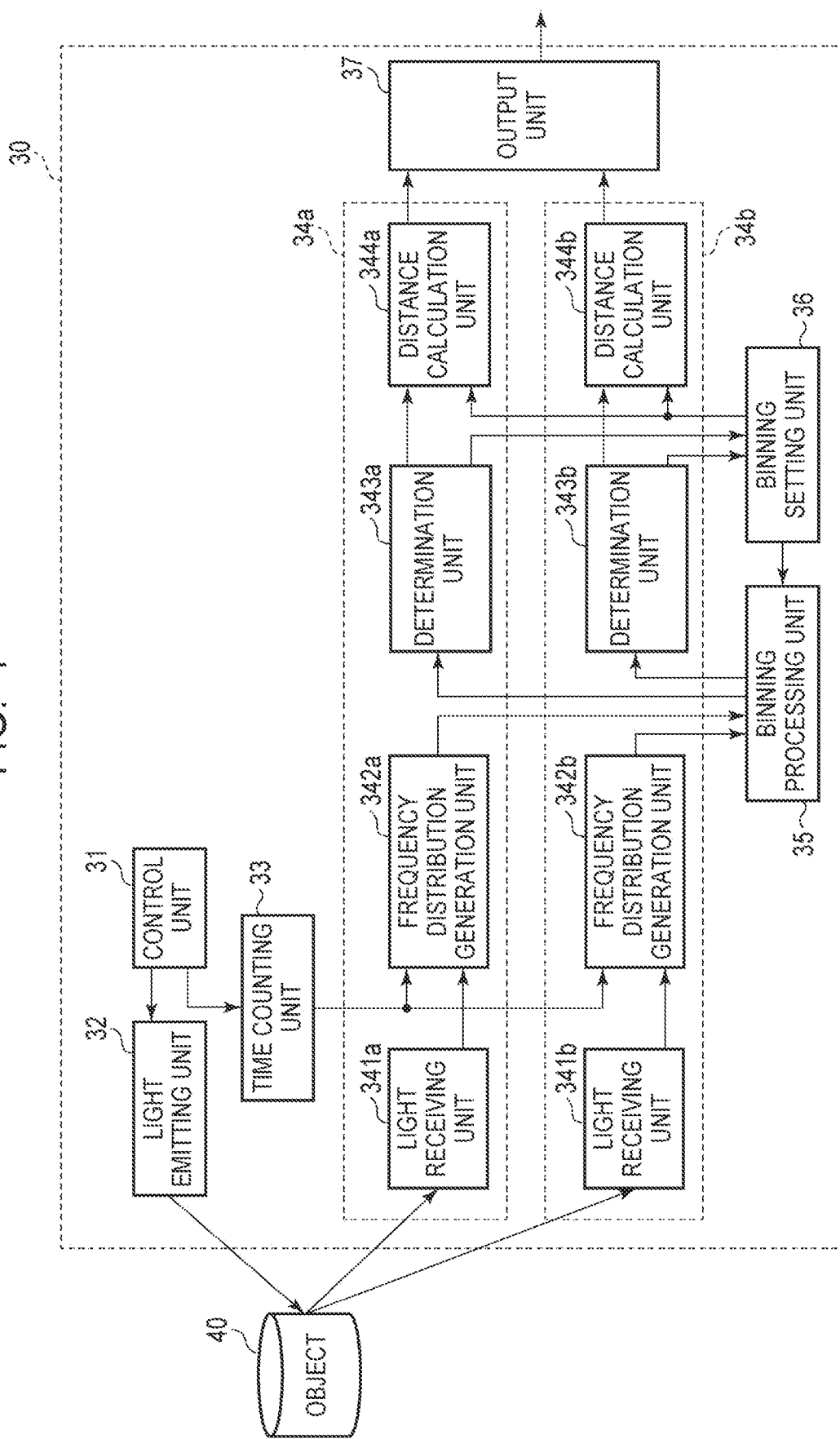
FIG. 1 is a block diagram illustrating a schematic configuration example of a ranging device according to a first embodiment.

Preferred embodiments of the present invention will now be described in detail in accordance with the accompanying drawings. In the drawings, the same or corresponding elements are denoted by the same reference numerals, and the description thereof may be omitted or simplified.

First Embodiment

FIG. 1 is a block diagram illustrating a schematic configuration example of a ranging device 30 according to the present embodiment. The ranging device 30 includes a control unit 31, a light emitting unit 32, a time counting unit 33, ranging processing units 34a and 34b, a binning processing unit 35, a binning setting unit 36, and an output unit 37. The ranging processing unit 34a includes a light receiving unit 341a, a frequency distribution generation unit 342a, a determination unit 343a, and a distance calculation unit 344a. The ranging processing unit 34b includes a light receiving unit 341b, a frequency distribution generation unit 342b, a determination unit 343b, and a distance calculation unit 344b. Note that the configuration of the ranging device 30 illustrated in the present embodiment is an example, and is not limited to the illustrated configuration.

The ranging device 30 measures a distance to an object 40 by using a technique such as light detection and ranging (LiDAR). The ranging device 30 measures the distance from the ranging device 30 to the object 40 based on a time difference until the light emitted from the light emitting unit 32 is reflected by the object 40 and received by the light receiving units 341a and 341b.

The light received by light receiving elements of the light receiving units 341a and 341b includes ambient light such as sunlight in addition to the reflected light from the object 40. For this reason, the ranging device 30 measures incident light at each of a plurality of time intervals, and performs ranging in which the influence of ambient light is reduced by using a method of determining that reflected light is incident during a period in which the amount of light peaks. The ranging device 30 of the present embodiment may be a flash LiDAR that emits laser light to a predetermined ranging area including the object 40, and receives reflected light by a pixel array. The pixel array includes a plurality of light receiving units arranged two-dimensionally. Each of the plurality of light receiving units may be referred to as a pixel.

In the present embodiment, in order to simplify the description, it is assumed that the number of pixels of the pixel array is 16 pixels in total, with 4 pixels in the horizontal direction (X direction) and 4 pixels in the vertical direction (Y direction), but it is not limited to this and may be changed accordingly. The X coordinates and the Y coordinates of these pixels are from (0, 0) to (3, 3). The ranging processing unit 34a is arranged corresponding to, among 16 pixels, a pixel whose X coordinate and Y coordinate are (0, 0). The ranging processing unit 34b is arranged corresponding to, among 16 pixels, a pixel whose X coordinate and Y coordinate are (1, 0). Although not illustrated in FIG. 1, ranging processing units corresponding to the other pixels are arranged in the same manner as the ranging processing units 34a and 34b in the ranging device 30.

The ranging device 30 of the present embodiment can perform binning processing in which a plurality of pixels in the pixel array are collectively handled as one pixel. Thereby, although the spatial resolution in the light-receiving surface of the pixel array decreases, the sensitivity can be improved because the light-receiving area can be enlarged in a pseudo-manner. In general, by performing binning processing for n pixels, a random component of noise is reduced to $1/\sqrt{n}$.

The light emitting unit 32 is a light source that emits light such as laser light to the outside of the ranging device 30. When the ranging device 30 is a flash LiDAR, the light emitting unit 32 may be a surface light source such as a surface emitting laser.

The time counting unit 33 performs time counting based on the control of the control unit 31, and acquires an elapsed time from a time at which counting is started as a digital signal. The control unit 31 synchronously controls an emission timing of the light emitting unit 32 and a timing at which the time counting unit 33 starts the time counting. The time counting unit 33 counts the elapsed time from the light emission by increasing the time count value by one each time a certain time elapses after the start of counting. The time counting unit 33 includes, for example, a circuit such as a ring oscillator and a counter, and counts a clock pulse that vibrates at high speed and at a constant period, thereby performing the time counting. For example, when the cycle of the clock pulse is one nanosecond and the time count value is counted up from "0", which is an initial value, to "10", it is understood that the elapsed time from the start of the time counting is 10 nanoseconds by referring to the time count value.

Each of the light receiving units 341a and 341b receives light including reflected light emitted from the light emitting unit 32 and reflected by the object 40. Each of the light receiving units 341a and 341b generates a pulse signal including a pulse based on the incident light. The light receiving units 341a and 341b are, for example, a photoelectric conversion device including an avalanche photodiode as a photoelectric conversion element. In this case, when one photon is incident on the avalanche photodiode and a charge is generated, one pulse is generated by avalanche multiplication. However, the light receiving units 341a and 341b may include, for example, photoelectric conversion elements using other photodiodes.

Note that a plurality of photoelectric conversion elements may be arranged in one light receiving unit, and pulses based on incident light on the plurality of photoelectric conversion elements may be integrated and counted as a count value of the same pixel. This processing is referred to as pixel binning processing. Although the spatial resolution in the light receiving surface of the pixel array decreases by performing the pixel binning processing, the probability that the pixel receives the reflected light can be improved, and a distance in which the ranging can be performed is extended.

The frequency distribution generation units 342a and 342b, the determination units 343a and 343b, the distance calculation units 344a and 344b, the binning processing unit 35, the binning setting unit 36, and the output unit 37 are signal processing circuits that perform signal processing on the pulse signals output from the light receiving units 341a and 341b. The signal processing circuits may include a counter for counting pulses, a processor for performing arithmetic processing of digital signals, a memory for storing digital signals, and the like. The memory may be, for example, a semiconductor memory. The control of the operation timings and the like of each unit in the signal processing circuits may be performed by a control circuit (not illustrated), or may be performed by the control unit 31.

The frequency distribution generation units 342a and 342b are memories that store the number of input pulses (light reception count value) divided for each time interval. Since each of the plurality of time intervals corresponds to one interval of a histogram of the light reception count values, the time intervals are sometimes referred to as bins. When receiving pulses from the light receiving units 341a and 341b, the frequency distribution generation units 342a and 342b acquire time count values output by the time counting unit 33. The time count values correspond to times at which a photon enter the light receiving units 341a and 341b. The frequency distribution generation units 342a and 342b identify a bin corresponding to the acquired time count value, that is, the reception time. For example, when the time count value is counted up in units of 1 nanosecond and the bins are divided in units of 10 nanoseconds, the number of the bin at the light reception time is 1/10 of the time count value. In this way, the frequency distribution generation units 342a and 342b can identify a bin corresponding to the time count value. Next, the frequency distribution generation units 342a and 342b increase the light reception count value of the specified bin by one. Through such processing, the frequency distribution generation units 342a and 342b generate frequency distributions including the light reception count values of the plurality of bins.

The binning processing unit 35 acquires a setting value of the number of pixels to be subjected to the binning processing (the number of binning pixels) from the binning setting unit 36. The binning processing unit 35 performs binning processing on the frequency distributions output from the frequency distribution generation units 342a and 342b based on the setting value. In a specific example of the ranging described below, in order to simplify the description, it is assumed that the number of binning pixels can be set to either 1×1 or 2×1. Here, the notation "m×n" of the number of binning pixels indicates that the range of pixels to be subjected to the binning processing is m pixels in the X direction and n pixels in the Y direction. It should be noted that the 1×1 setting can be referred to as a condition for outputting the frequency distribution as it is without performing the binning processing because the range of the binning processing is only one pixel.

When the number of binning pixels is 1×1, the binning processing unit 35 outputs the frequency distributions output from the frequency distribution generation units 342a and 342b to the determination units 343a and 343b as they are. When the number of binning pixels is 2×1, the frequency distributions output from the frequency distribution generation units 342a and 342b are subjected to the binning processing and output to the determination units 343a and 343b. The binning processing is specifically a processing of summing the light reception count values for each bin with respect to a plurality of inputted frequency distributions.

The determination units 343a and 343b determine whether or not a component of reflected light is included in the frequency distribution output from the binning processing unit 35, and output determination results. The processing of determining the reflected light may be, for example, determining that a component of the reflected light is included in the frequency distribution when there is a bin whose light reception count value exceeds a predetermined threshold value, and determining that a component of the reflected light is not included in the frequency distribution when there is no bin whose light reception count value exceeds the predetermined threshold value. The threshold value used for this determination may be a predetermined constant value, or may be a value obtained by averaging the light reception count values of the bins and adding a constant value. Since the S/N ratio improves as the number of binning pixels increases, appropriate determination can be made even when the threshold value is set low. Therefore, the threshold value may be changed based on the number of binning pixels.

When determining that the component of the reflected light is included in the frequency distribution, the determination units 343a and 343b output information indicating a bin corresponding to the reception time of the reflected light to the distance calculation units 344a and 344b, respectively. When there are a plurality of bins whose light reception count value exceeds the threshold value, information indicating a bin whose light reception time is the earliest may be output. In this case, bins with close distances are prioritized. Alternatively, when there are a plurality of bins whose light reception count value exceeds the threshold value, information indicating a bin whose light reception count value is the largest or a bin whose difference between the light reception count value and the threshold value is the largest may be output. In this case, a bin with strong reflected light is prioritized. The priority of these bins may be appropriately set depending on the application.

The distance calculation units 344a and 344b calculate and output a distance to the object 40 based on the number of binning pixels output from the binning setting unit 36, the determination result of the reflected light output from the determination units 343a and 343b, and the bin corresponding to the reception time of the reflected light. For example, when the component of the reflected light is included in the frequency distribution, the distance is calculated from the bin corresponding to the reception time and the calculated distance is output. For example, the distance calculation units 344a and 344b may calculate the distance from the ranging device 30 to the object 40 using the expression "(bin number of reception time)×(length of time interval per bin)×(speed of light)/2". When the number of binning pixels has reached the upper limit and the reflected light cannot be detected, the distance calculation units 344a and 344b output information indicating that the distance cannot be calculated. The output unit 37 outputs the distance information output from the ranging processing units 34a and 34b corresponding to each pixel to the outside of the ranging device 30.

The binning setting unit 36 outputs the setting of the number of binning pixels to the binning processing unit 35. The binning setting unit 36 calculates a minimum number of binning pixels determined to include a component of reflected light in the frequency distribution while changing the number of binning pixels from 1×1 to the upper limit value of the number of binning pixels that can be subjected to the binning processing.

Figure 2:
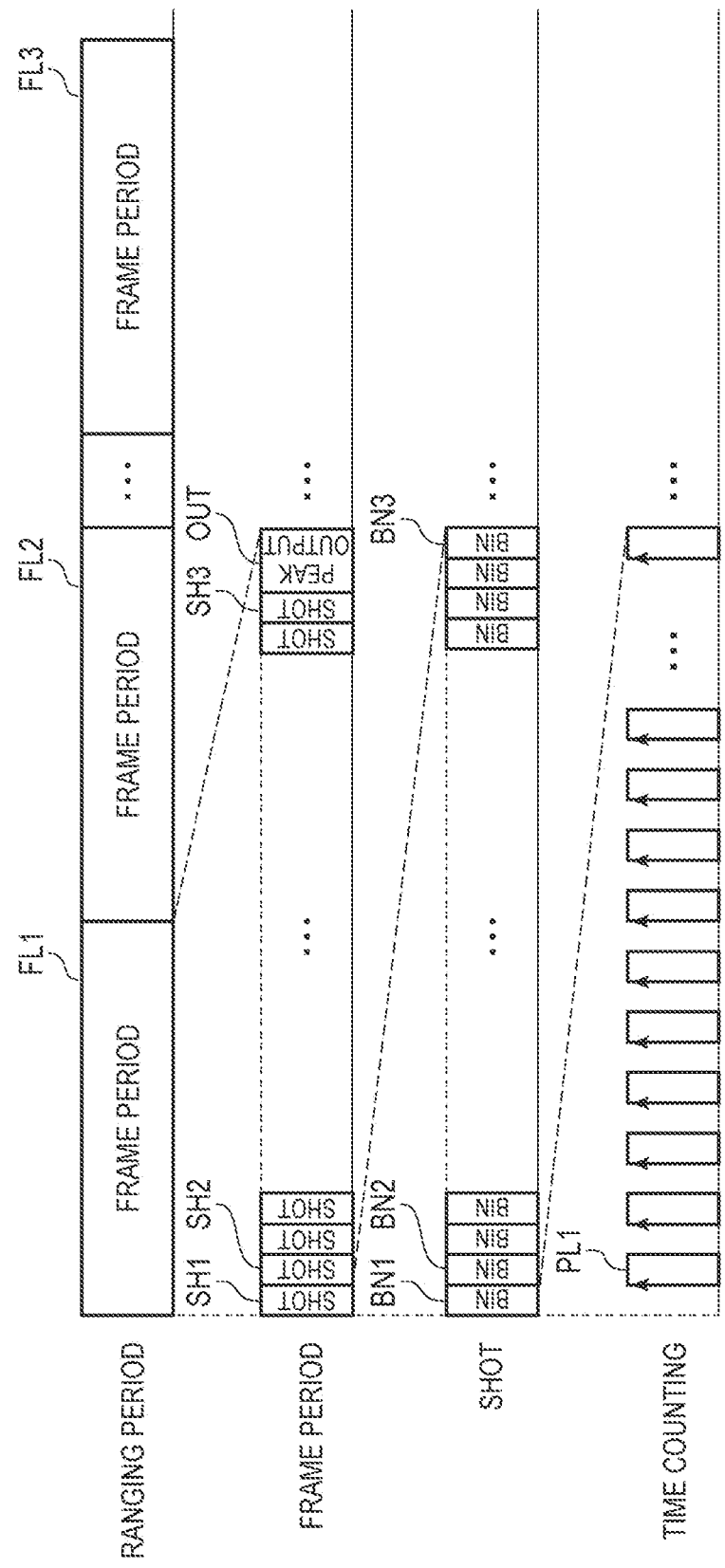
FIG. 2 is a diagram schematically illustrating an operation of the ranging device according to the first embodiment in one ranging period.

FIG. 2 is a diagram illustrating an outline of the operation of the ranging device 30 according to the present embodiment in one ranging period. In the description of FIG. 2, it is assumed that the ranging device 30 is a flash LiDAR. In the "ranging period" of FIG. 2, a plurality of frame periods FL1, FL2, . . . , FL3 included in one ranging period are illustrated. The frame period FL1 indicates a first frame period in one ranging period, the frame period FL2 indicates a second frame period in one ranging period, and the frame period FL3 indicates a last frame period in one ranging period. The frame period is a period in which the ranging device 30 performs one ranging and outputs a signal indicating a distance (ranging result) from the ranging device 30 to the object 40 to the outside.

In the "frame period" of FIG. 2, a plurality of shots SH1, SH2, . . . , SH3 included in the frame period FL1 and a peak output OUT are illustrated. The shot is a period in which the light emitting unit 32 emits light once and a frequency distribution is generated by a light reception count value based on the light emission. The shot SH1 indicates a first shot in the frame period FL1. The shot SH2 indicates a second shot in the frame period FL1. The shot SH3 indicates a last shot in the frame period FL1. The peak output OUT indicates a period during which a ranging result is output based on a peak acquired by accumulating signals of a plurality of shots.

In the "shot" of FIG. 2, a plurality of bins BN1, BN2, . . . , BN3 included in the shot SH1 are illustrated. "bin" indicates one time interval during which a series of pulse counting is performed, and is a period during which a light reception count value is acquired by counting pulses. The bin BN1 indicates the fastest bin in the shot SH1. The bin BN2 indicates a next bin of bin BN1 in the shot SH1. The bin BN3 indicates a last bin in the shot SH1.

The "time counting" in FIG. 2 schematically illustrates a pulse PL1 used for time counting in the time counting unit 33 in the bin BN1. As illustrated in FIG. 2, the time counting unit 33 generates a time count value by counting the pulse PL1 that rises periodically. When the time count value reaches a predetermined value, the bin BN1 ends, and the process transitions to the next bin BN2.

Figure 3A:
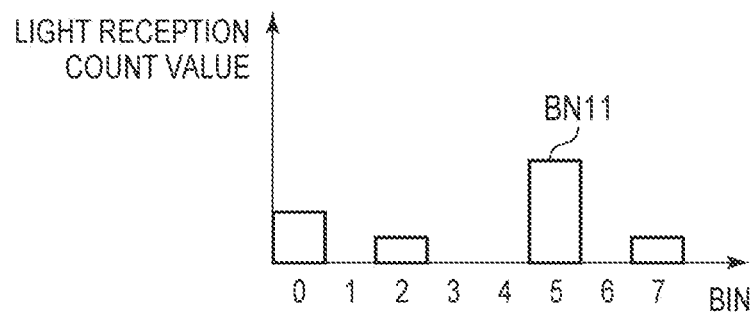
FIGS. 3A, 3B, 3C, and 3D are histograms schematically illustrating a frequency distribution of the light reception count values according to the first embodiment.
Figure 3B:
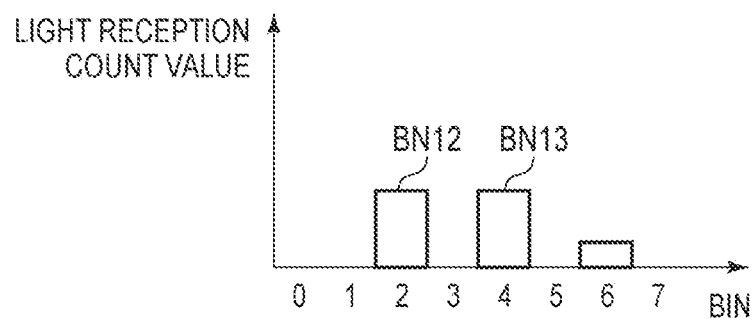
Figure 3C:
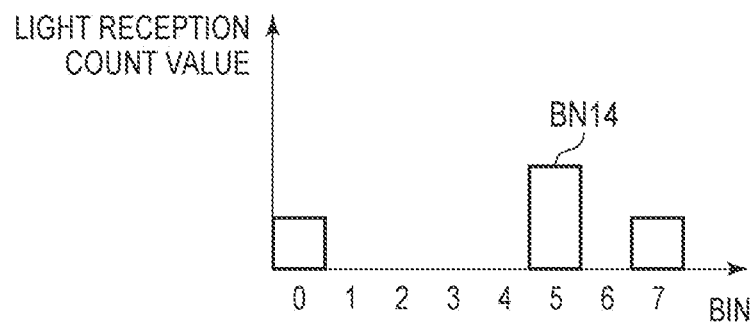
Figure 3D:
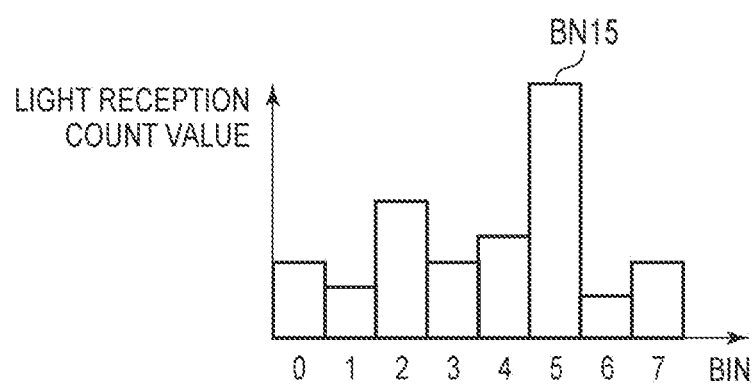

FIGS. 3A to 3D are histograms schematically illustrating frequency distributions of light reception count values generated by the frequency distribution generation units 342a and 342b. FIGS. 3A, 3B, and 3C illustrate examples of histograms of light reception count values (corresponding to the number of photons) in the first shot, the second shot, and the third shot, respectively. FIG. 3D illustrates an example of a histogram acquired by integrating the number of photons of all shots. The horizontal axis represents a bin number, which corresponds to an elapsed time from light emission. An interval of the histogram corresponds to a period of one bin in which photon detection is performed. The vertical axis represents the light reception count value detected in each bin period. In these histograms, the bin number of the earliest bin is "0", and the earliest bin may be referred to as a zeroth bin and the next bin may be referred to as a first bin.

As illustrated in FIG. 3A, in the first shot, the light reception count value of the fifth bin BN11 is a peak. As illustrated in FIG. 3B, in the second shot, the number of photons of the second bin BN12 is equal to the number of photons of the fourth bin BN13, and these are peaks. As illustrated in FIG. 3C, in the third shot, the number of photons of the fifth bin BN14 is a peak. In the second shot, different bins from the other shots are peaks. This is due to light reception count values due to ambient light other than the reflected light from the object 40.

As illustrated in FIG. 3D, in the histogram obtained by integrating the number of photons of all shots, the fifth bin BN15 is a peak. In the peak output OUT illustrated in FIG. 2, the time information of the bin corresponding to the peak of the integrated frequency distribution is output. The distance between the ranging device 30 and the object 40 can be calculated from the time information.

By integrating the pulse count values of a plurality of shots, it is possible to detect a bin having a high possibility of reflected light from the object 40 more accurately even when pulse count by ambient light is included as in the second shot illustrated in FIG. 3B. Therefore, even when the light emitted from the light emitting unit 32 is weak, the ranging can be performed with high accuracy by employing a process in which a plurality of shots are repeated. In the flash LiDAR, in some cases, it is required to lower the intensity of the emitted light in order to ensure safety of the eyeball depending on the use environment. Thus, even when the intensity of the reflected light is low and the influence of the ambient light is high, the ranging accuracy can be ensured by using a method of integrating a plurality of shots as described above. Further, when the number of pixels of the pixel array is large in order to improve the resolution, the area of the photoelectric conversion element becomes small and the sensitivity may be reduced, but the ranging accuracy can be ensured by using a method of integrating a plurality of shots as described above. Further, in the present embodiment, the ranging accuracy can also be ensured by performing the binning processing if necessary.

Figure 4:
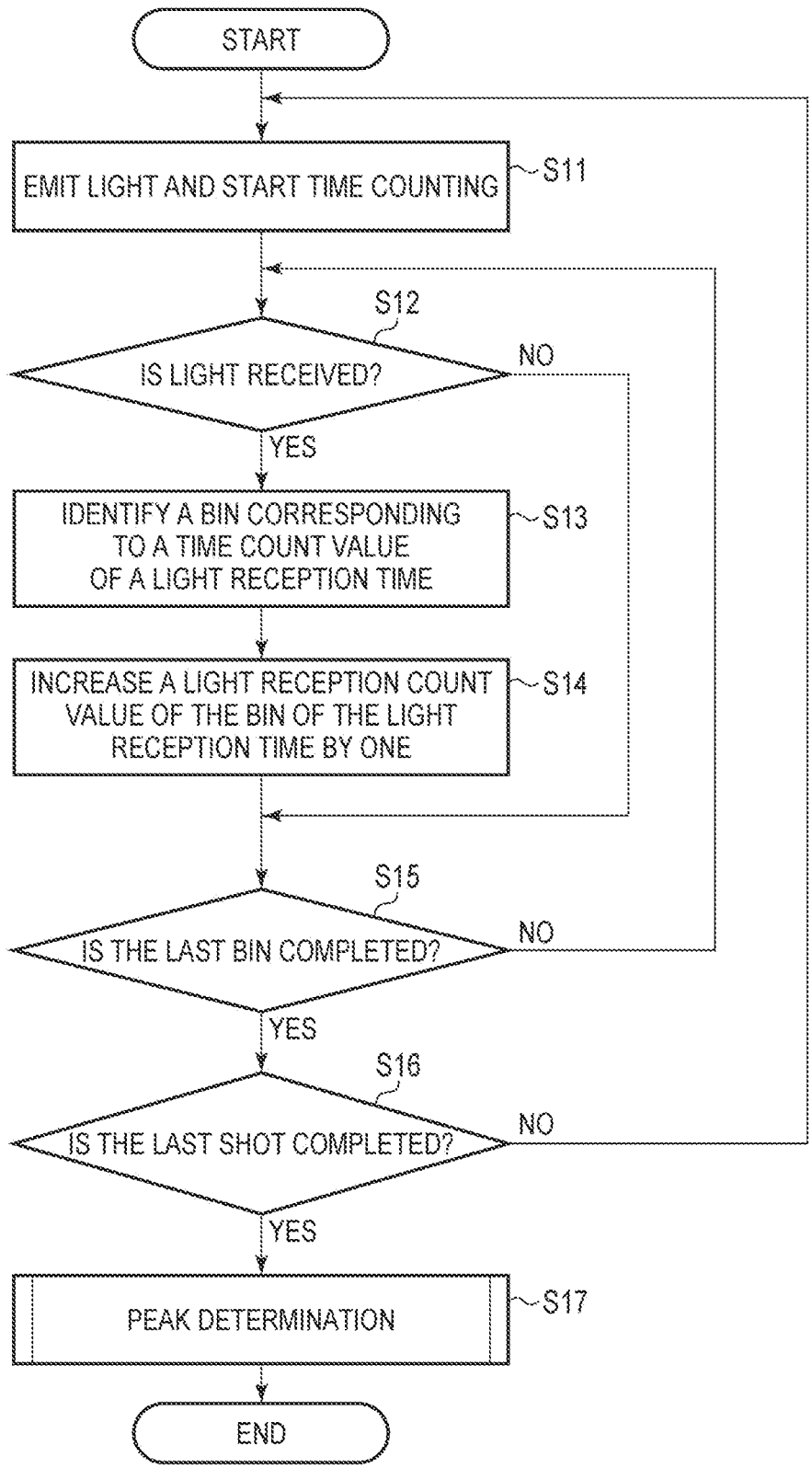
FIG. 4 is a flowchart illustrating an operation of the ranging device according to the first embodiment in one frame period.

FIG. 4 is a flowchart illustrating an operation of the ranging device 30 according to the present embodiment in one frame period. FIG. 4 illustrates the operation from the start to the end of one frame period. In FIG. 4, a loop from step S12 to step S15 indicates a process in which signal acquisition of one shot is performed. A loop from step S11 to step S16 indicates a process in which signal acquisition from the first shot to the last shot is performed.

In the step S11, the light emitting unit 32 emits light to the ranging area. At the same time, the time counting unit 33 starts time counting. Thereby, the signal acquisition processing of one shot is started. The control unit 31 synchronously controls the light emission of the light emitting unit 32 and the start of counting by the time counting unit 33. Thus, the elapsed time from the light emission can be counted.

In the step S12, when the light is detected by the light receiving units 341a and 341b (YES in the step S12), the process proceeds to step S13. When no light is detected (NO in the step S12), the process proceeds to the step S15.

In the step S13, the frequency distribution generation units 342a and 342b identify a bin corresponding to the light reception time from the time count value output from the time counting unit 33. Then, in step S14, the frequency distribution generation units 342a and 342b increase the light reception count value of the identified bin by one. In the step S15, the frequency distribution generation units 342a and 342b determine whether or not the detection of light reception of the last bin is completed based on the time count value. When the detection of light reception of the last bin is completed (YES in the step S15), the process proceeds to the step S16 to complete the operation of the shot. When the detection of light reception of the last bin has not been completed (NO in the step S15), the process proceeds to the step S12 and the detection of light in the shot is continued.

In the step S16, when the shot completed immediately before is the last shot (YES in the step S16), the process proceeds to step S17. When the shot completed immediately before is not the last shot (NO in the step S16), the process proceeds to the step S12 to start the operation of the next shot.

In the step S17, the binning processing unit 35, the determination units 343a and 343b, the binning setting unit 36, and the distance calculation units 344a and 344b perform peak determination processing. The peak determination processing will be described with reference to FIGS. 5 and 6.

Figure 5:
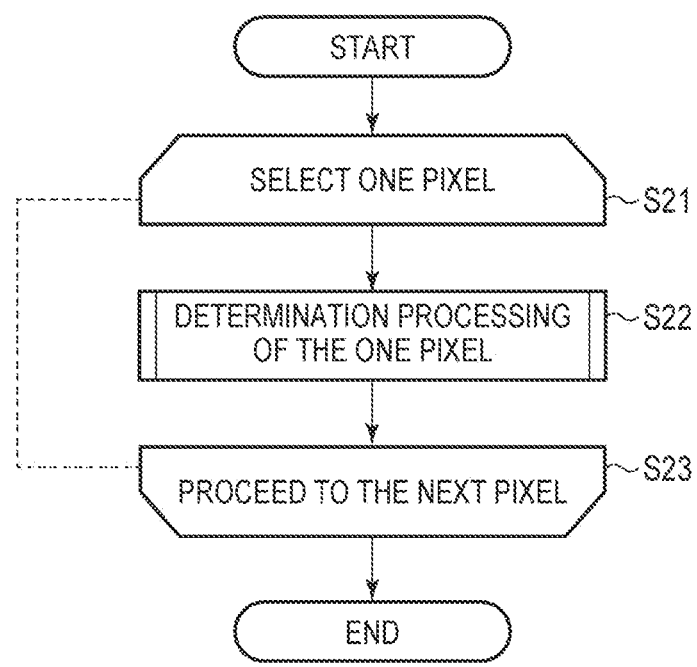
FIG. 5 is a flowchart illustrating an operation of peak determination processing according to the first embodiment.

FIG. 5 is a flowchart illustrating an operation of peak determination processing according to the present embodiment. FIG. 5 illustrates the peak determination processing in the step S17 of FIG. 4 in more detail.

The peak determination processing in step S17 includes a loop process from step S21 to step S23. In the step S21, one pixel to be subjected to peak determination is selected from the plurality of pixels. In step S22, peak determination processing is performed on the selected pixel. When the processing of the selected pixel ends in the step S23, a pixel to be subjected to the processing is shifted to the next pixel. This loop process is continued until the processing of all the pixels is completed. In this way, the peak determination processing in the step S17 is sequentially executed for each of the plurality of pixels. The order of the processing is not particularly limited, and for example, the processing may be executed sequentially from the upper left pixel to the lower right pixel. Further, the determination processing of the step S22 may be performed in parallel for a plurality of pixels.

Figure 6:
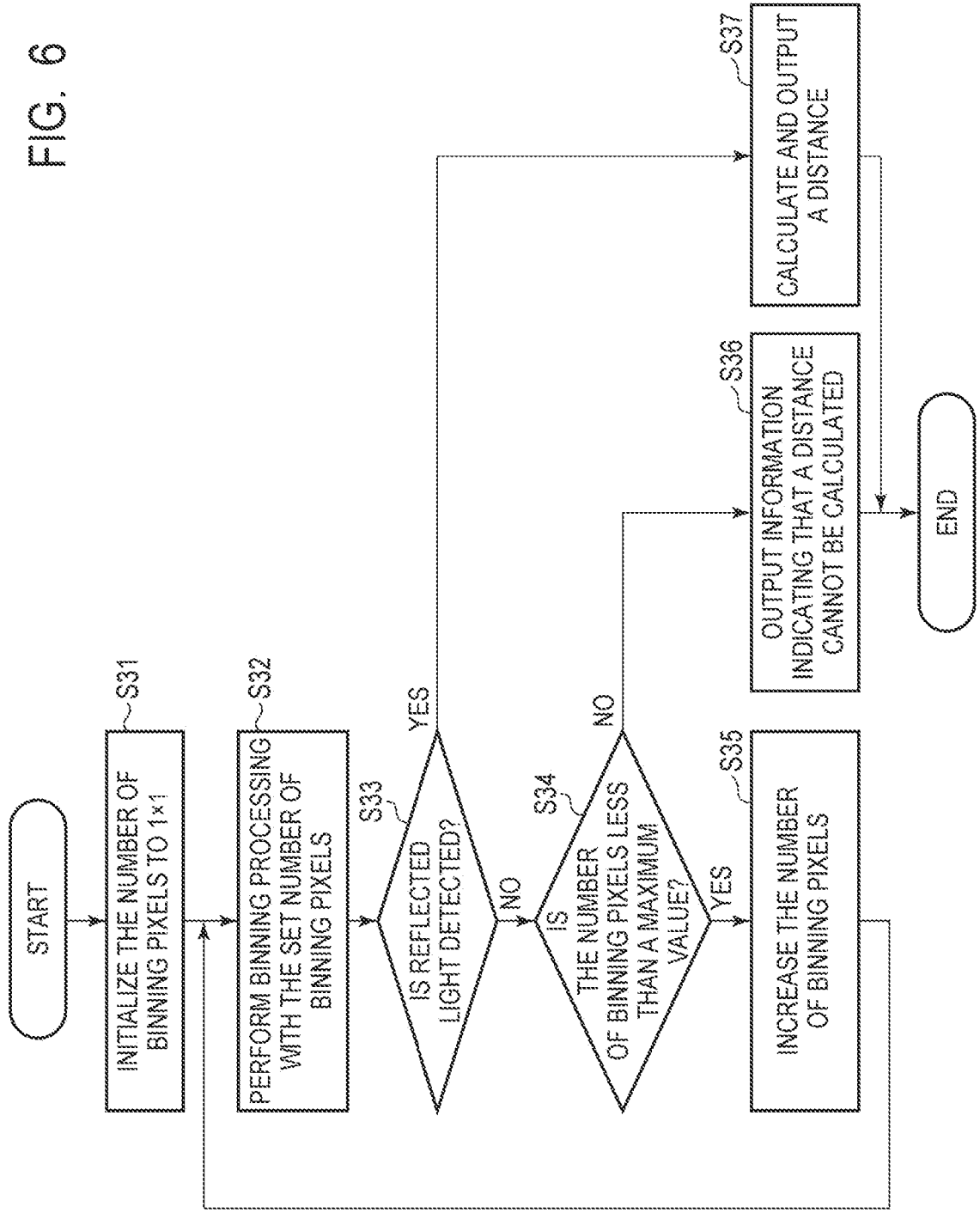
FIG. 6 is a flowchart illustrating peak determination processing for one pixel according to the first embodiment.

FIG. 6 is a flowchart illustrating a peak determination processing for one pixel according to the present embodiment. FIG. 6 illustrates in more detail the peak determination processing for one pixel in the step S22 of FIG. 5. In the example of FIG. 6, the initial value of the number of binning pixels is set to a minimum 1×1 pixel (no binning processing), and the number of binning pixels is increased stepwise according to the detection result of the reflected light to obtain the minimum number of binning pixels within a range in which the distance can be calculated. However, the method of setting the number of binning pixels is not limited to this. For example, a method of starting the initial value of the number of binning pixels from the maximum value and reducing the number of binning pixels according to the detection result of the reflected light may be applied. Alternatively, a method of obtaining an appropriate value of the number of binning pixels by a bisection method may be applied.

In step S31, the binning setting unit 36 initializes the number of binning pixels to 1×1. The binning setting unit 36 outputs the setting of the number of binning pixels to the binning processing unit 35.

In step S32, the binning processing unit 35 performs binning processing on the frequency distribution according to the number of binning pixels output from the binning setting unit 36. When the number of binning pixels is 1×1, the binning processing unit 35 outputs the frequency distribution of the light reception count value of each bin of the pixel to be processed at coordinates (X, Y). That is, the binning processing unit 35 outputs the frequency distribution as it is without performing the binning processing.

When the number of binning pixels is 2×1, the binning processing unit 35 obtains a set of coordinates (Xi, Yi) that satisfy the conditions of floor(X/2)=floor(Xi/2) and floor(Y/1)=floor(Yi/1) with respect to the coordinates (X, Y) of the pixels. Then, the binning processing unit 35 adds the light reception count value of each bin for all the pixels of the coordinates included in the set of coordinates (Xi, Yi), and outputs it as a frequency distribution of the coordinates (X, Y). Note that, "floor(x)" is a function that returns a maximum integer equal to or less than x (a floor function). For example, in the case where the number of binning pixels is 2×1, when the above-described calculation is performed for the coordinates (0, 0) and (1, 0), floor(0/2)=floor(1/2) and floor(0/1)=floor(0/1). Therefore, the frequency distribution of the coordinates (0, 0) and the frequency distribution of the coordinates (1, 0) are added and output. Similarly, in the case where the number of binning pixels is 1×3, a set of coordinates (Xi, Yi) is obtained so that floor(X/1)=floor(Xi/1) and floor(Y/3)=floor(Yi/3) with respect to the coordinates (X, Y) of the pixel. The binning processing unit 35 outputs a frequency distribution obtained by adding the light reception count value of each bin for three coordinates included in the set of coordinates (Xi, Yi). It should be noted that it may be possible to set for each pixel whether or not to apply the binning processing according to the above rule. For example, some pixels may be set so that the binning processing is not performed thereto, or all pixels may be set so that the binning processing is performed thereto according to the above rule.

In step S33, each of the determination units 343a and 343b determines whether or not a component of reflected light is included in the frequency distribution output from the binning processing unit 35, and outputs a determination result. When it is determined that there is reflected light in the pixel being processed (YES in the step S33), the process proceeds to step S37. When it is determined that there is no reflected light in the pixel being processed (NO in the step S33), the processing proceeds to step S34.

In the step S34, the binning setting unit 36 determines whether or not the current number of binning pixels is less than a maximum value. When the number of binning pixels is less than the maximum value (YES in the step S34), the process proceeds to step S35. When the number of binning pixels is the maximum value (NO in the step S34), the process proceeds to step S36. When the number of binning pixels is either 1×1 or 2×1, it is determined that it is less than the maximum value when the number of binning pixels is 1×1, and it is determined that it is not less than the maximum value when the number of binning pixels is 2×1.

In the step S35, the binning setting unit 36 increases the number of binning pixels. After that, the process returns to the step S32, the binning processing is performed again by the increased number of binning pixels, and the reflected light is detected again. This processing may be, for example, changing the setting of the number of binning pixels from 1×1 to 2×1.

When the number of settings of the number of binning pixels is three or more, the order in which the number of binning pixels is increased three or more times by repeating the loop from the step S32 to the step S35 is not particularly limited. For example, the number of pixels in the X direction and the number of pixels in the Y direction may be alternately increased. In this method, the number of binning pixels is increased in the order of 1×1, 2×1, 2×2, 3×2, . . . . Alternatively, the number of pixels in the Y direction may be increased after the number of pixels in the X direction is increased a plurality of times. In this method, the number of binning pixels is increased in the order of 1×1, 2×1, 3×1, 3×2, . . . .

In the step S36, since the reflected light cannot be detected even when the number of binning pixels is set to the maximum value, the distance calculation units 344*a* and 344*b* output information indicating that the distance cannot be calculated. The processing of outputting this information may be, for example, processing of outputting a flag indicating that the distance cannot be calculated, processing of outputting a maximum value of the distance, processing of outputting a signal indicating that the distance is infinity, or the like, but the processing is not limited thereto. The information indicating that the distance cannot be calculated may be collectively output using the coordinates after the binning processing, or may be output for each coordinate when the number of binning pixels is 1×1, as in the example described later.

In the step S37, since the reflected light can be detected, the distance calculation units 344*a* and 344*b* calculate and output the distance from the bin corresponding to the reception time of the reflected light.

Next, an example of the determination result of the reflected light generated by the peak determination processing of FIG. 6 and an output signal of the distance output unit will be described with reference to FIGS. 7 to 19. FIG. 7 is a diagram illustrating coordinates of each pixel according to the present embodiment. As illustrated in FIG. 7, the following description will be given assuming that 16 pixels are arranged in four rows and four columns from coordinates (0, 0) to coordinates (3, 3). In this description, it is assumed that the number of binning pixels can be set to either 1×1 or 2×1.

Figure 13:
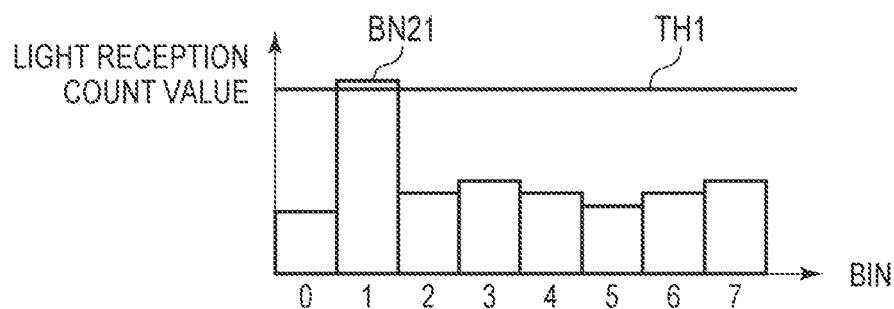
FIG. 13 is an example of a histogram of a pixel at coordinates (0, 0) according to the first embodiment.

First, the peak determination process of FIG. 6 for the coordinates (0, 0) will be described. In the step S31, the number of binning pixels is initialized to 1×1. In the step S32 immediately after that, since the number of binning pixels is 1×1, the frequency distribution of the pixel at the coordinates (0, 0) is output as it is. FIG. 13 is an example of a histogram of the pixel at coordinates (0, 0) according to the present embodiment. In the example of FIG. 13, since the light reception count value of the first bin BN21 exceeds a threshold value TH1, it is determined in the step S33 that reflected light is included. FIG. 8 is a diagram illustrating an example of outputs of the determination units 343*a* and 343*b* where the number of binning pixels is 1×1 according to the present embodiment. As illustrated in FIG. 8, the determination output of the coordinates (0, 0) is "1" indicating that reflected light is included. Therefore, the process proceeds to the step S37. In the example of FIG. 13, assuming that the time intervals of the bins correspond to a distance of 20 m, the distance corresponding to the bin BN21 exceeding the threshold value TH1 is 20 m.

Figure 12:
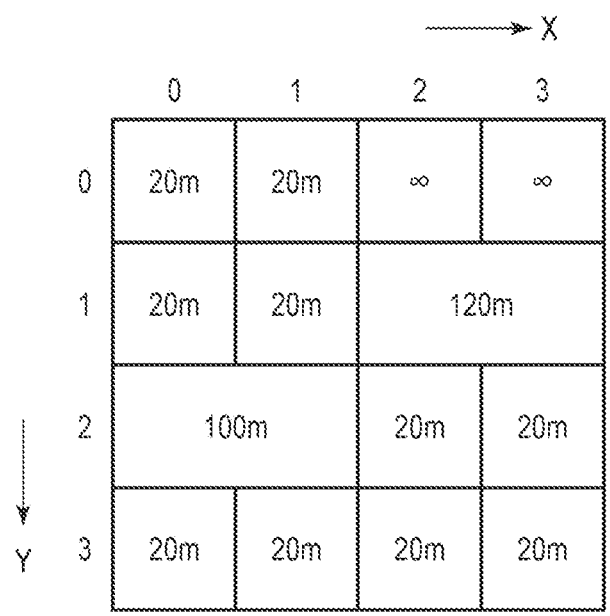
FIG. 12 is a diagram illustrating an example of an output of the distance calculation unit at the end of processing according to the first embodiment.
Figure 20:
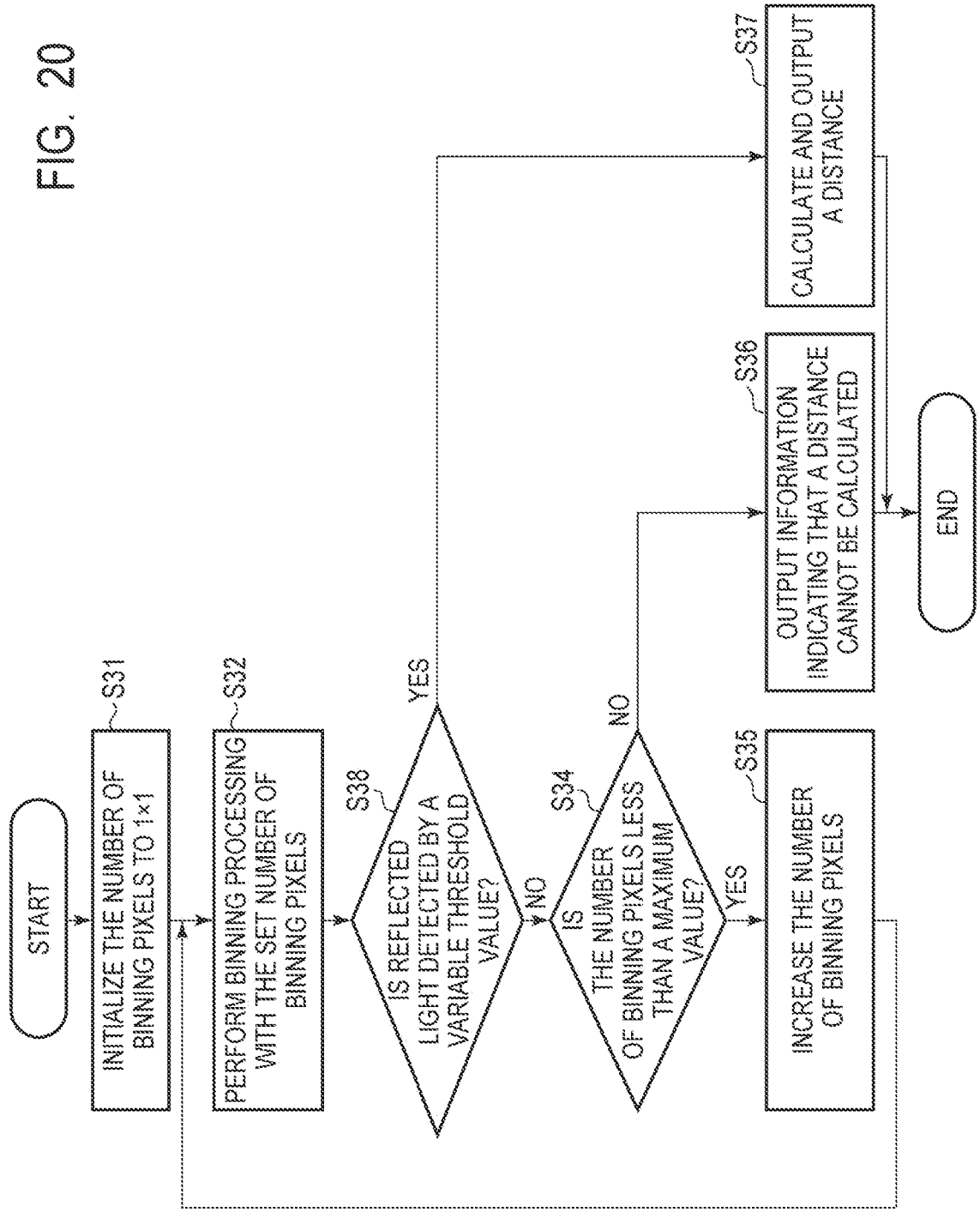
FIG. 20 is a flowchart illustrating peak determination processing for one pixel according to a second embodiment.

In the step S37, the distance calculation units 344*a* and 344*b* calculate a distance corresponding to the bin BN21 that exceeds the threshold value TH1, and output the calculated distance as a distance of the coordinates (0, 0). FIG. 9 is a diagram illustrating an example of outputs of the distance calculation units 344*a* and 344*b* where the number of binning pixels is 1×1 according to the present embodiment. FIG. 12 is a diagram illustrating an example of outputs of the distance calculation units 344*a* and 344*b* at the time of end of processing according to the present embodiment. As illustrated in FIGS. 9 and 12, 20 m is output as a distance at coordinates (0, 0).

Figure 14:
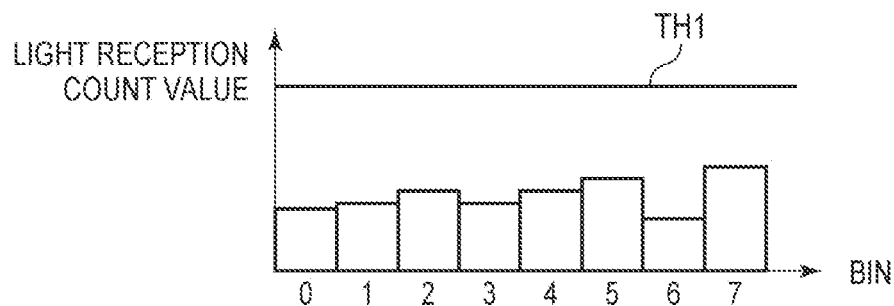
FIG. 14 is an example of a histogram of a pixel at coordinates (0, 2) according to the first embodiment.

Next, the peak determination process of FIG. 6 for the coordinates (0, 2) will be described. In the step S31, the number of binning pixels is initialized to 1×1. In the step S32 immediately after that, since the number of binning pixels is 1×1, the frequency distribution of the pixel at the coordinates (0, 2) is output as it is. FIG. 14 is an example of a histogram of the pixel at coordinates (0, 2) according to the present embodiment. In the example of FIG. 14, since there is no bin exceeding the threshold value TH1, it is determined in the step S33 that reflected light is not included. As illustrated in FIG. 8, the determination output of the coordinates (0, 2) is "0" indicating that the reflected light is not included. Therefore, the process proceeds to the step S34.

In the step S34, since the number of binning pixels is 1×1, it is determined that the number of binning pixels is less than the maximum value. Therefore, the process proceeds to the step S35. In the step S35, the number of binning pixels is changed to 2×1, and the process returns to the step S32.

Figure 15:
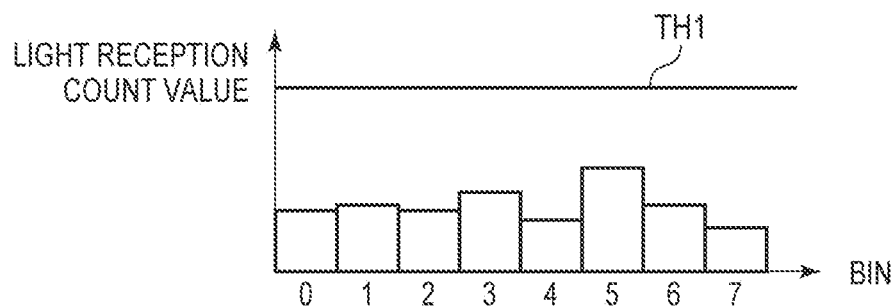
FIG. 15 is an example of a histogram of a pixel at coordinates (1, 2) according to the first embodiment.
Figure 16:
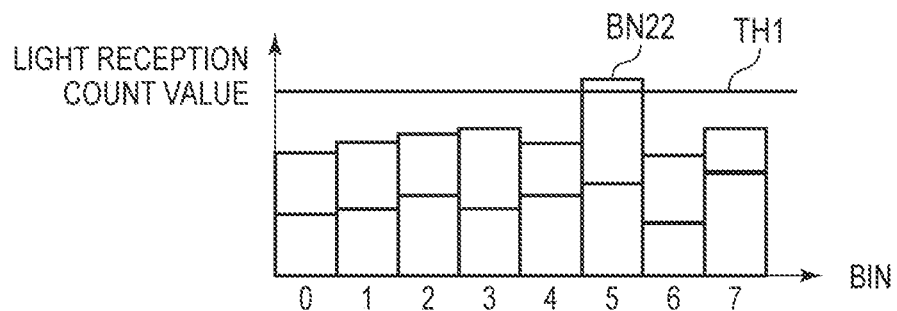
FIG. 16 is an example of a histogram obtained by performing binning processing on the pixel of coordinates (0, 2) and the pixel of coordinates (1, 2) according to the first embodiment.

In the step S32, since the number of binning pixels is 2×1, the frequency distributions are added for the pixels of the coordinates (0, 2) and (1, 2) and output. FIG. 14 illustrates an example of a histogram of the pixel at coordinates (0, 2) according to the present embodiment, and FIG. 15 illustrates an example of a histogram of the pixel at coordinates (1, 2) according to the present embodiment. FIG. 16 illustrates an example of a histogram obtained by performing binning processing on the pixel of coordinates (0, 2) and the pixel of coordinates (1, 2) according to the present embodiment. That is, FIG. 16 is a sum of the histogram of FIG. 14 and the histogram of FIG. 15. In the example of FIG. 16, since the light reception count value of the fifth bin BN22 exceeds the threshold value TH1, it is determined in the step S33 that reflected light is included. FIG. 10 is a diagram illustrating an example of outputs of the determination units 343*a* and 343*b* where the number of binning pixels is 2×1 according to the present embodiment. As illustrated in FIG. 10, the determination output of the coordinates (0, 2) is "1" indicating that reflected light is included. Therefore, the process proceeds to the step S37. In the example of FIG. 16, assuming that the time intervals of the bins correspond to a distance of 20 m, the distance corresponding to the bin BN22 exceeding the threshold value TH1 is 100 m.

Figure 11:
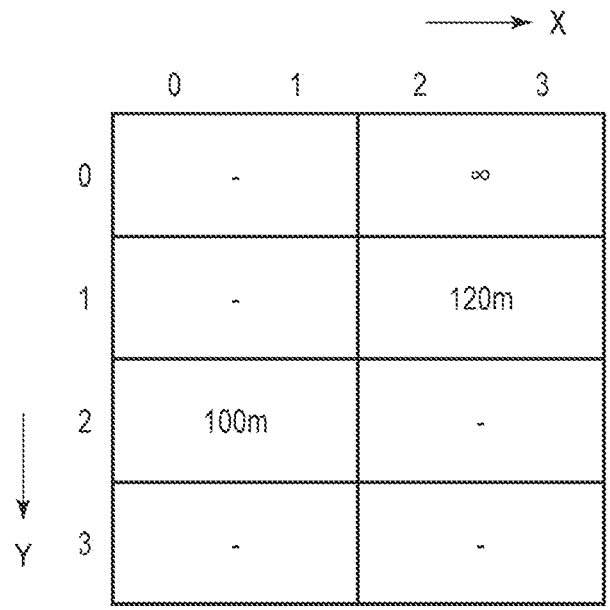
FIG. 11 is a diagram illustrating an example of an output of the distance calculation unit where the number of binning pixels is 2×1 according to the first embodiment.

In the step S37, the distance calculation units 344*a* and 344*b* calculate a distance corresponding to the bin BN22 that exceeds the threshold value TH1, and output the calculated distance as a distance of the coordinates (0, 2). FIG. 11 is a diagram illustrating an example of outputs of the distance calculation units 344*a* and 344*b* where the number of binning pixels is 2×1 according to the present embodiment. FIG. 12 is a diagram illustrating an example of outputs of the distance calculation units 344*a* and 344*b* at the time of end of processing according to the present embodiment. As illustrated in FIGS. 11 and 12, 100 m is output as a distance at coordinates (0, 2).

Figure 17:
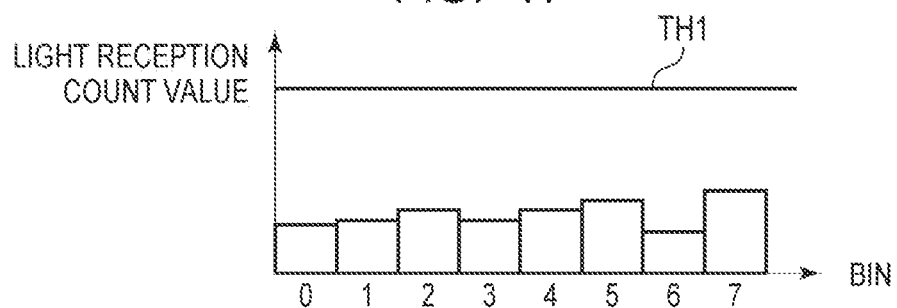
FIG. 17 is an example of a histogram of a pixel at coordinates (2, 0) according to the first embodiment.

Next, the peak determination process of FIG. 6 for the coordinates (2, 0) will be described. In the step S31, the number of binning pixels is initialized to 1×1. In the step S32 immediately after that, since the number of binning pixels is 1×1, the frequency distribution of the pixels at the coordinates (2, 0) is output as it is. FIG. 17 is an example of a histogram of the pixel at coordinates (2, 0) according to the present embodiment. In the example of FIG. 17, since there is no bin exceeding the threshold value TH1, it is determined in the step S33 that reflected light is not included. As illustrated in FIG. 8, the determination output of the coordinates (2, 0) is "0" indicating that the reflected light is not included. Therefore, the process proceeds to the step S34.

In the step S34, since the number of binning pixels is 1×1, it is determined that the number of binning pixels is less than the maximum value. Therefore, the process proceeds to the step S35. In the step S35, the number of binning pixels is changed to 2×1, and the process returns to the step S32.

Figure 18:
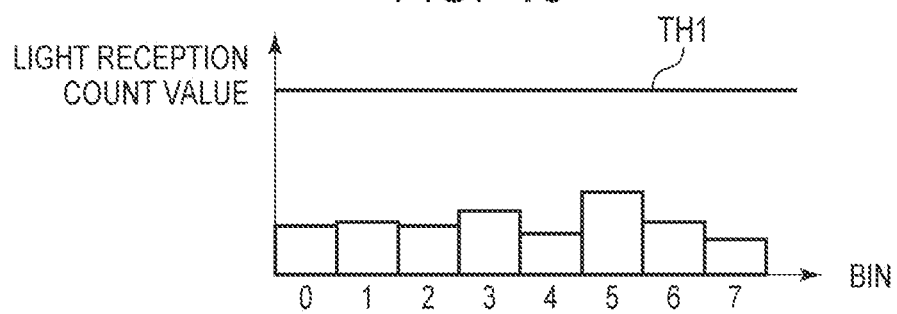
FIG. 18 is an example of a histogram of a pixel at coordinates (3, 0) according to the first embodiment.
Figure 19:
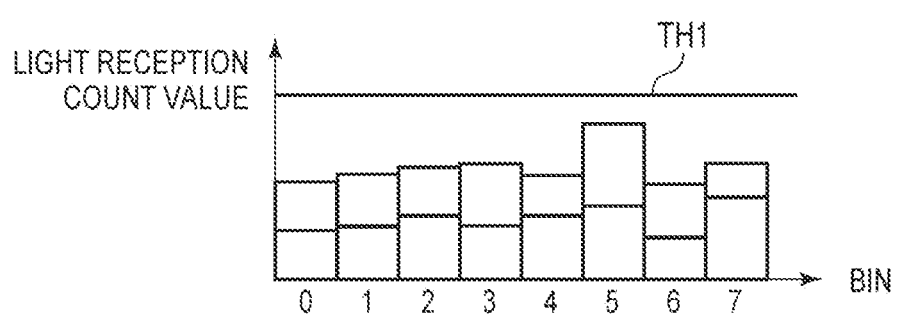
FIG. 19 is an example of a histogram obtained by performing binning processing on the pixel of coordinates (2, 0) and the pixel of coordinates (3, 0) according to the first embodiment.

In the step S32, since the number of binning pixels is 2×1, the frequency distributions are added for the pixels of the coordinates (2, 0) and (3, 0) and output. FIG. 17 illustrates an example of a histogram of the pixel at coordinates (2, 0) according to the present embodiment, and FIG. 18 illustrates an example of a histogram of the pixel at coordinates (3, 0) according to the present embodiment. FIG. 19 illustrates an example of a histogram obtained by performing binning processing on the pixel of coordinates (2, 0) and the pixel of coordinates (3, 0) according to the present embodiment. That is, FIG. 19 is a sum of the histogram of FIG. 17 and the histogram of FIG. 18. In the example of FIG. 19, since there is no bin exceeding the threshold value TH1, it is determined in the step S33 that reflected light is not included. As illustrated in FIG. 10, the determination output of the coordinates (2, 0) is "0" indicating that the reflected light is not included. Therefore, the processing proceeds to the step S34.

In the step S34, since the number of binning pixels is 2×1, it is determined that the number of binning pixels is not less than the maximum value (the number of binning pixels is the maximum value). Therefore, the process proceeds to the step S36. In the step S36, since the reflected light cannot be detected even when the number of binning pixels is set to the maximum value, the distance calculation units 344*a* and 344*b* output information indicating that the distance cannot be calculated. The coordinates (2, 0) in FIGS. 11 and 12 indicate that the reflected light cannot be detected, and thus an infinity symbol (∞) is expressed.

In the above example, the number of binning pixels can be set to either 1×1 or 2×1. However, the number of binning pixels may be set to a value larger than 2×1 pixels. In this case, similar processing can be realized by repeatedly executing the processing from the step S32 to the step S35 to increase the number of binning pixels to a value larger than 2×1 pixels.

In the present embodiment, the number of the frequency distribution generation units to be subjected to the binning processing is changed depending on whether or not a component of reflected light is included in the frequency distribution after binning processing. Therefore, for example, in the case where the intensity of the reflected light varies depending on the region to be measured, it is possible to reduce the noise by the binning processing in the region where the reflected light is weak while maintaining a high spatial resolution in the region where the reflected light is strong. As a result, highly accurate ranging is possible. Further, in the present embodiment, even in the case where the number of the frequency distribution generation units to be subjected to the binning processing is changed, since it is not necessary to acquire the frequency distribution again by receiving the light again, an increase in delay time accompanying the reacquisition of the frequency distribution is suppressed. Therefore, according to the present embodiment, it is possible to provide a ranging device capable of improving ranging accuracy while suppressing an increase in delay time.

Second Embodiment

In the first embodiment, as illustrated in FIGS. 13 to 19, the threshold value used for the determination of the reflected light is constant for each bin. However, this threshold may not be constant and may be variable from bin to bin. Hereinafter, as a second embodiment, detection of reflected light using a variable threshold value will be described. Since the difference between the first embodiment and the second embodiment is only the operation of the determination units 343*a* and 343*b*, the difference will be mainly described below, and the other points will be appropriately omitted or simplified.

FIG. 20 is a flowchart illustrating a peak determination processing for one pixel according to the present embodiment. The flowchart of FIG. 20 differs from the flowchart of FIG. 6 in that the step S33 is replaced with step S38.

In the step S38, the determination units 343*a* and 343*b* compare the threshold value that is variable for each bin and the light reception count value of each bin in the frequency distribution. Thus, the determination units 343*a* and 343*b* determine whether or not the frequency distribution output from the binning processing unit 35 includes a component of reflected light, and output determination results. When it is determined that there is reflected light in the pixel being processed (YES in the step S38), the process proceeds to the step S37. When it is determined that there is no reflected light in the pixel being processed (NO in the step S38), the processing proceeds to the step S34. The variable threshold is set to a larger value for a bin at an earlier time and set to a smaller value for a bin at a later time.

Figure 21:
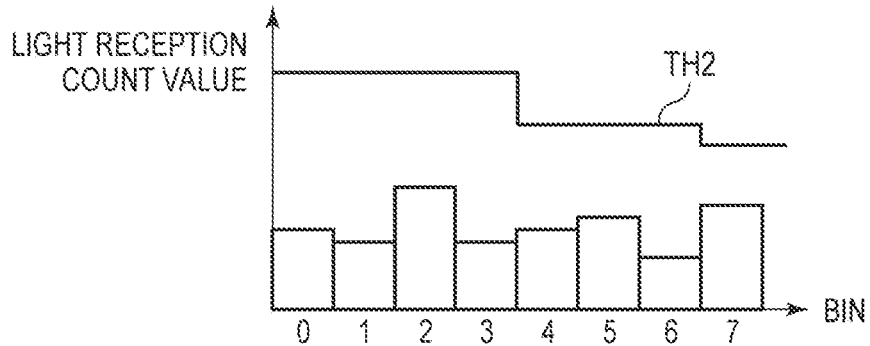
FIG. 21 illustrates an example of a histogram of a pixel at coordinates (0, 2) according to the second embodiment.
Figure 22:
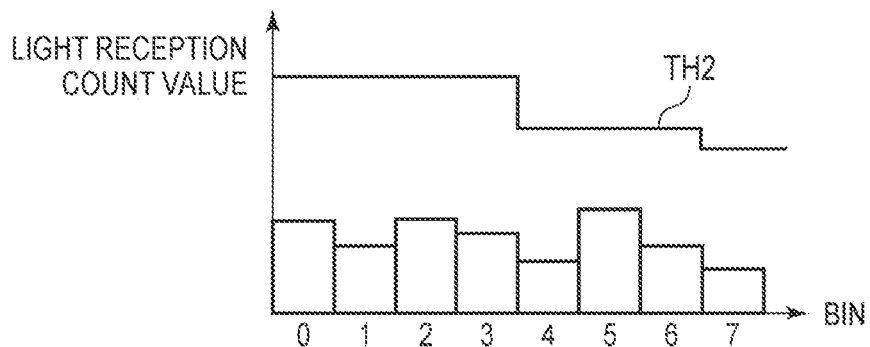
FIG. 22 is an example of a histogram of a pixel at coordinates (1, 2) according to the second embodiment.

Next, detection of reflected light in the step S38 of FIG. 20 will be described with reference to FIGS. 21 to 24. FIG. 21 illustrates an example of a histogram of the pixel at coordinates (0, 2) according to the present embodiment, and FIG. 22 illustrates an example of a histogram of the pixel at coordinates (1, 2) according to the present embodiment. As illustrated in FIGS. 21 and 22, the threshold value TH2 has a stepwise variable value that is set to a smaller value for a bin at a later time. Since the light reception count values of all the bins do not exceed the threshold value TH2 in any of the pixels of the coordinates, the binning processing is performed on these pixels with the number of binning pixels of 2×1.

Figure 23:
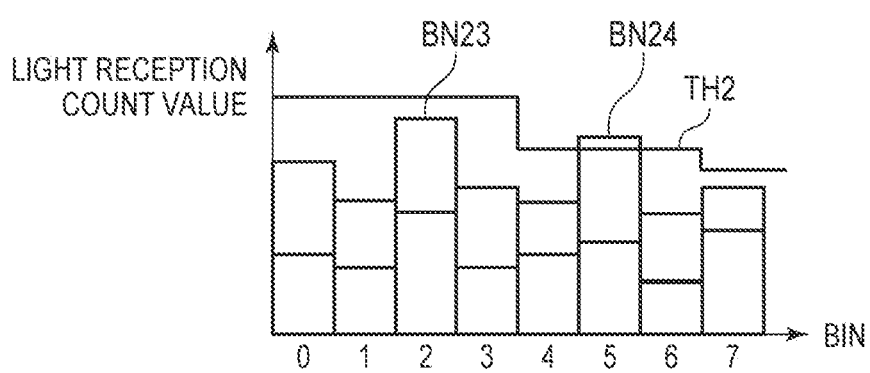
FIG. 23 is an example of a histogram obtained by performing binning processing on the pixel of coordinates (0, 2) and the pixel of coordinates (1, 2) according to the second embodiment.

FIG. 23 is an example of a histogram obtained by performing binning processing pixels of coordinates (0, 2) and pixels of coordinates (1, 2) according to the embodiment. That is, FIG. 23 is a sum of the histogram of FIG. 21 and the histogram of FIG. 22. In the example of FIG. 23, since the light reception count value of the fifth bin BN24 exceeds the threshold value TH2, it is determined in the step S38 that reflected light is included. In the example of FIG. 23, assuming that the time intervals of the bins correspond to a distance of 20 m, the distance corresponding to the bin BN24 exceeding the threshold value TH2 is 100 m. In the example of FIG. 23, since the light reception count value of the second bin BN23 does not exceed the threshold value TH2, the second bin BN23 is not detected as reflected light.

An effect obtained by applying the variable threshold value TH2 that is set to a value larger for a bin at an earlier time and smaller for a bin at a later time as in the present embodiment will be described. In general, the intensity of the reflected light from the object 40 is stronger as the object 40 is closer to the ranging device 30, and is weaker as the object 40 is farther from the ranging device 30. Therefore, by setting the threshold value of the bin at the early time corresponding to the short distance to be large and the threshold value of the bin at the late time corresponding to the long distance to be small, it is possible to reduce the possibility of erroneous determination due to detection of light other than reflected light at the short distance.

Figure 24:
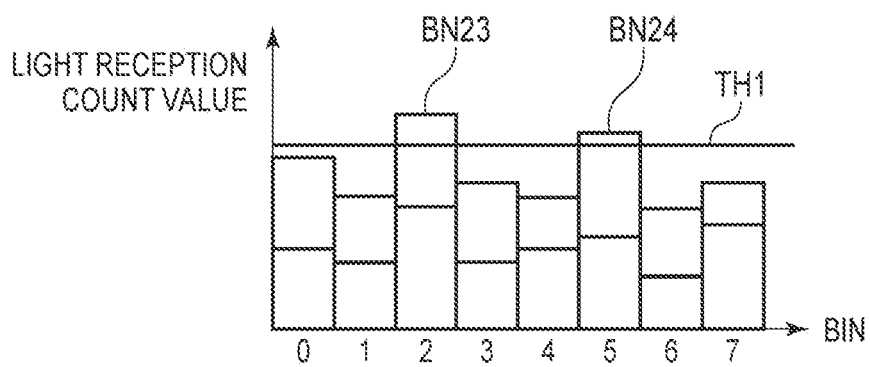
FIG. 24 is an example of a histogram obtained by performing binning processing on the pixel of coordinates (0, 2) and the pixel of coordinates (1, 2) according to a comparative example of the second embodiment.

FIG. 24 is an example of a histogram obtained by preforming binning processing on the pixel of coordinates (0, 2) and the pixel of coordinates (1, 2) according to a comparative example of the present embodiment. The difference from FIG. 23 is that a constant threshold value TH1 is applied instead of the threshold value TH2 as in the first embodiment. As illustrated in FIG. 24, in this comparative example, in the example of FIG. 24, both the light reception count value of the second bin BN23 and the light reception count value of the fifth bin BN24 exceed the threshold value TH1. Assuming that the light reception count value of the second bin BN23 is due to light other than reflected light, in the situation of this comparative example, erroneous determination may occur because the second bin BN23 exceeds the threshold value TH1 and the light reception count value of the bin BN23 is the maximum. On the other hand, in the example in which the variable threshold value TH2 as illustrated in FIG. 23 is used, since the light reception count value of the second bin BN23 does not exceed the threshold value TH2, erroneous determination does not occur.

Also in this embodiment, the same effect as in the first embodiment can be obtained. In addition, in the present embodiment, the possibility of erroneous determination can be reduced by applying a variable threshold value TH2 that is set to a larger value for a bin at an earlier time and a smaller value for a bin at a later time.

It should be noted that the threshold value TH2 is not limited to a step shape in which bins as illustrated in FIGS. 21 to 23 are divided into several ranges and are set to different values for each range. Since the intensity of light is generally inversely proportional to the square of the distance, the threshold value TH2 in each bin may be set to a different value by a calculation equation having a term inversely proportional to the square of the distance.

Third Embodiment

In the present embodiment, a specific configuration example of a photoelectric conversion device including an avalanche photodiode which can be applied to the ranging device 30 according to the first or second embodiment will be described. The configuration example of the present embodiment is an example, and the photoelectric conversion device applicable to the ranging device 30 is not limited thereto.

Figure 25:
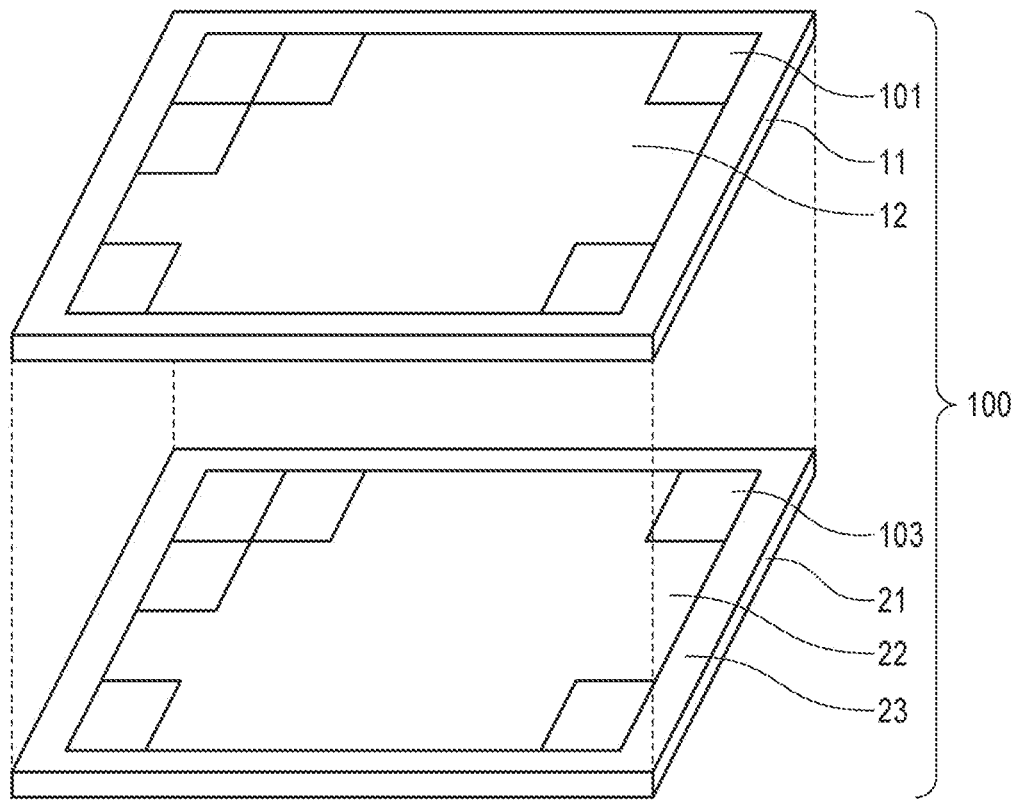
FIG. 25 is a schematic view illustrating the overall configuration of a photoelectric conversion device according to a third embodiment.

FIG. 25 is a schematic diagram illustrating an overall configuration of the photoelectric conversion device 100 according to the present embodiment. The photoelectric conversion device 100 includes a sensor substrate 11 (first substrate) and a circuit substrate 21 (second substrate) stacked on each other. The sensor substrate 11 and the circuit substrate 21 are electrically connected to each other. The sensor substrate 11 has a pixel region 12 in which a plurality of pixel circuits 101 are arranged to form a plurality of rows and a plurality of columns. The circuit substrate 21 includes a first circuit region 22 in which a plurality of pixel signal processing units 103 are arranged to form a plurality of rows and a plurality of columns, and a second circuit region 23 arranged outside the first circuit region 22. The second circuit region 23 may include a circuit for controlling the plurality of pixel signal processing units 103. The sensor substrate 11 has a light incident surface for receiving incident light and a connection surface opposed to the light incident surface. The sensor substrate 11 is connected to the circuit substrate 21 on the connection surface side. That is, the photoelectric conversion device 100 is a so-called backside illumination type.

In this specification, the term "plan view" refers to a view from a direction perpendicular to a surface opposite to the light incident surface. The cross section indicates a surface in a direction perpendicular to a surface opposite to the light incident surface of the sensor substrate 11. Although the light incident surface may be a rough surface when viewed microscopically, in this case, a plan view is defined with reference to the light incident surface when viewed macroscopically.

In the following description, the sensor substrate 11 and the circuit substrate 21 are diced chips, but the sensor substrate 11 and the circuit substrate 21 are not limited to chips. For example, the sensor substrate 11 and the circuit substrate 21 may be wafers. When the sensor substrate 11 and the circuit substrate 21 are diced chips, the photoelectric conversion device 100 may be manufactured by being diced after being stacked in a wafer state, or may be manufactured by being stacked after being diced.

Figure 26:
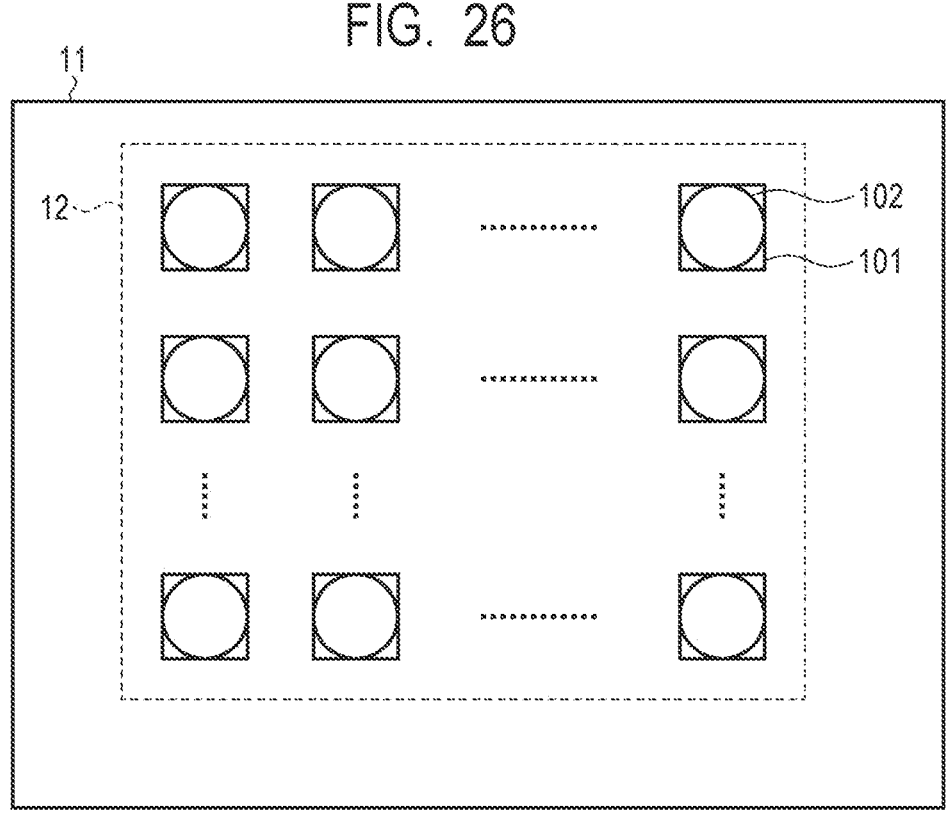
FIG. 26 is a schematic block diagram illustrating a configuration example of a sensor substrate according to the third embodiment.

FIG. 26 is a schematic block diagram illustrating an arrangement example of the sensor substrate 11. In the pixel region 12, a plurality of pixel circuits 101 are arranged to form a plurality of rows and a plurality of columns. Each of the plurality of pixel circuits 101 includes a photoelectric conversion unit 102 including an avalanche photodiode (hereinafter referred to as APD) as a photoelectric conversion element in the substrate.

Of the charge pairs generated in the APD, the conductivity type of the charge used as the signal charge is referred to as a first conductivity type. The first conductivity type refers to a conductivity type in which a charge having the same polarity as the signal charge is a majority carrier. Further, a conductivity type opposite to the first conductivity type, that is, a conductivity type in which a majority carrier is a charge having a polarity different from that of a signal charge is referred to as a second conductivity type. In the APD described below, the anode of the APD is set to a fixed potential, and a signal is extracted from the cathode of the APD. Accordingly, the semiconductor region of the first conductivity type is an N-type semiconductor region, and the semiconductor region of the second conductivity type is a P-type semiconductor region. Note that the cathode of the APD may have a fixed potential and a signal may be extracted from the anode of the APD. In this case, the semiconductor region of the first conductivity type is the P-type semiconductor region, and the semiconductor region of the second conductivity type is then N-type semiconductor region. Although the case where one node of the APD is set to a fixed potential is described below, potentials of both nodes may be varied.

Figure 27:
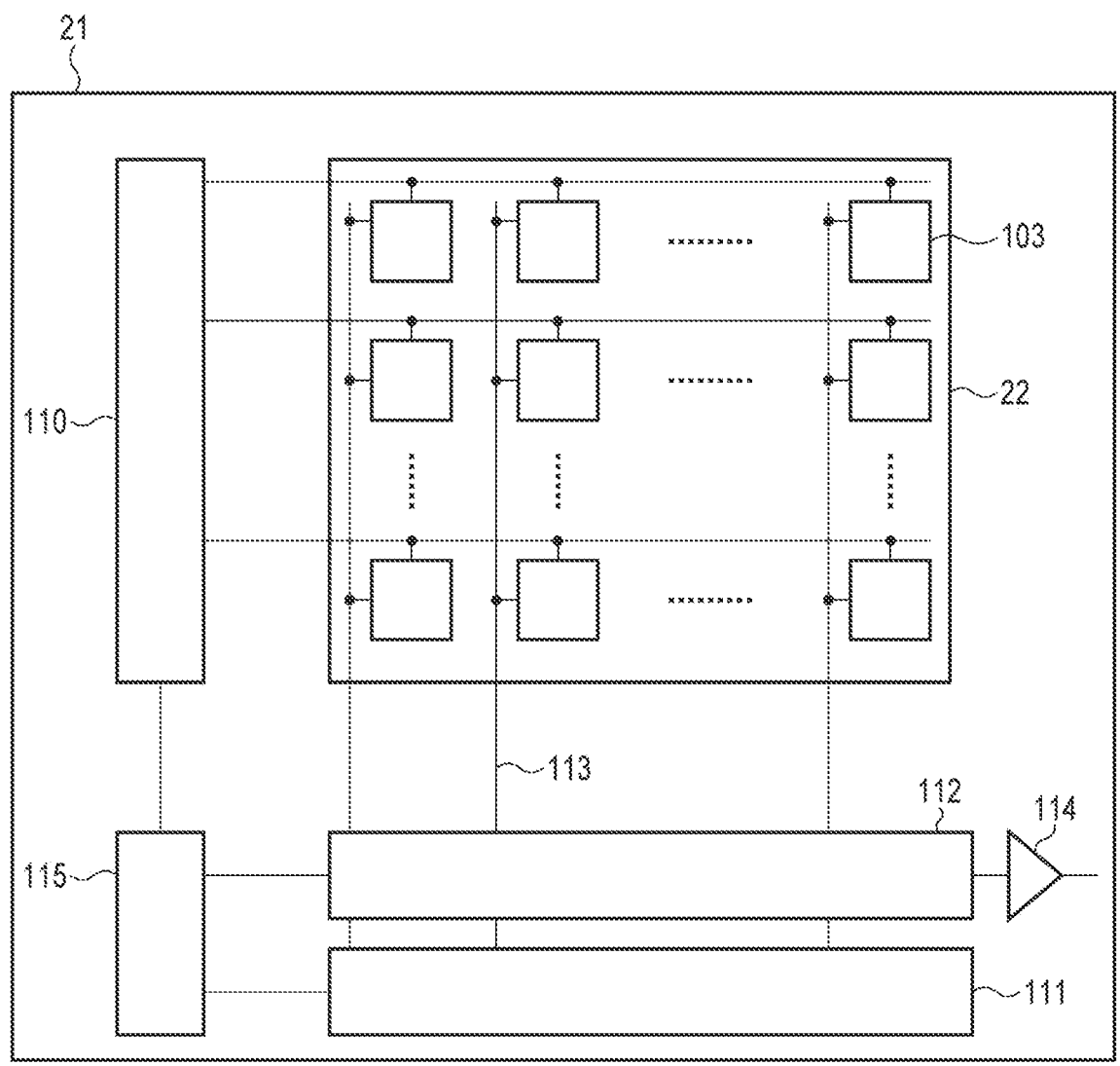
FIG. 27 is a schematic block diagram illustrating a configuration example of a circuit substrate according to the third embodiment.

FIG. 27 is a schematic block diagram illustrating a configuration example of the circuit substrate 21. The circuit substrate 21 has the first circuit region 22 in which a plurality of pixel signal processing units 103 are arranged to form a plurality of rows and a plurality of columns.

The circuit substrate 21 includes a vertical scanning circuit 110, a horizontal scanning circuit 111, a reading circuit 112, a pixel output signal line 113, an output circuit 114, and a control signal generation unit 115. The plurality of photoelectric conversion units 102 illustrated in FIG. 26 and the plurality of pixel signal processing units 103 illustrated in FIG. 27 are electrically connected to each other via connection wirings provided for each pixel circuits 101.

The control signal generation unit 115 is a control circuit that generates control signals for driving the vertical scanning circuit 110, the horizontal scanning circuit 111, and the reading circuit 112, and supplies the control signals to these units. As a result, the control signal generation unit 115 controls the driving timings and the like of each unit.

The vertical scanning circuit 110 supplies control signals to each of the plurality of pixel signal processing units 103 based on the control signal supplied from the control signal generation unit 115. The vertical scanning circuit 110 supplies control signals for each row to the pixel signal processing unit 103 via a driving line provided for each row of the first circuit region 22. As will be described later, a plurality of driving lines may be provided for each row. A logic circuit such as a shift register or an address decoder can be used for the vertical scanning circuit 110. Thus, the vertical scanning circuit 110 selects a row to be output a signal from the pixel signal processing unit 103.

The signal output from the photoelectric conversion unit 102 of the pixel circuits 101 is processed by the pixel signal processing unit 103. The pixel signal processing unit 103 acquires and holds a digital signal having a plurality of bits by counting the number of pulses output from the APD included in the photoelectric conversion unit 102.

It is not always necessary to provide one pixel signal processing unit 103 for each of the pixel circuits 101. For example, one pixel signal processing unit 103 may be shared by a plurality of pixel circuits 101. In this case, the pixel signal processing unit 103 sequentially processes the signals output from the photoelectric conversion units 102, thereby providing the function of signal processing to each pixel circuit 101.

The horizontal scanning circuit 111 supplies control signals to the reading circuit 112 based on a control signal supplied from the control signal generation unit 115. The pixel signal processing unit 103 is connected to the reading circuit 112 via a pixel output signal line 113 provided for each column of the first circuit region 22. The pixel output signal line 113 in one column is shared by a plurality of pixel signal processing units 103 in the corresponding column. The pixel output signal line 113 includes a plurality of wirings, and has at least a function of outputting a digital signal from the pixel signal processing unit 103 to the reading circuit 112, and a function of supplying a control signal for selecting a column for outputting a signal to the pixel signal processing unit 103. The reading circuit 112 outputs a signal to an external storage unit or signal processing unit of the photoelectric conversion device 100 via the output circuit 114 based on the control signal supplied from the control signal generation unit 115.

The arrangement of the photoelectric conversion units 102 in the pixel region 12 may be one-dimensional. Further, the function of the pixel signal processing unit 103 does not necessarily have to be provided one by one in all the pixel circuits 101. For example, one pixel signal processing unit 103 may be shared by a plurality of pixel circuits 101. In this case, the pixel signal processing unit 103 sequentially processes the signals output from the photoelectric conversion units 102, thereby providing the function of signal processing to each pixel circuit 101.

As illustrated in FIGS. 26 and 27, the first circuit region 22 having a plurality of pixel signal processing units 103 is arranged in a region overlapping the pixel region 12 in the plan view. In the plan view, the vertical scanning circuit 110, the horizontal scanning circuit 111, the reading circuit 112, the output circuit 114, and the control signal generation unit 115 are arranged so as to overlap a region between an edge of the sensor substrate 11 and an edge of the pixel region 12. In other words, the sensor substrate 11 includes the pixel region 12 and a non-pixel region arranged around the pixel region 12. In the circuit substrate 21, the second circuit region 23 having the vertical scanning circuit 110, the horizontal scanning circuit 111, the reading circuit 112, the output circuit 114, and the control signal generation unit 115 is arranged in a region overlapping with the non-pixel region in the plan view.

Note that the arrangement of the pixel output signal line 113, the arrangement of the reading circuit 112, and the arrangement of the output circuit 114 are not limited to those illustrated in FIG. 27. For example, the pixel output signal lines 113 may extend in the row direction, and may be shared by a plurality of pixel signal processing units 103 in corresponding rows. The reading circuit 112 may be provided so as to be connected to the pixel output signal line 113 of each row.

Figure 28:
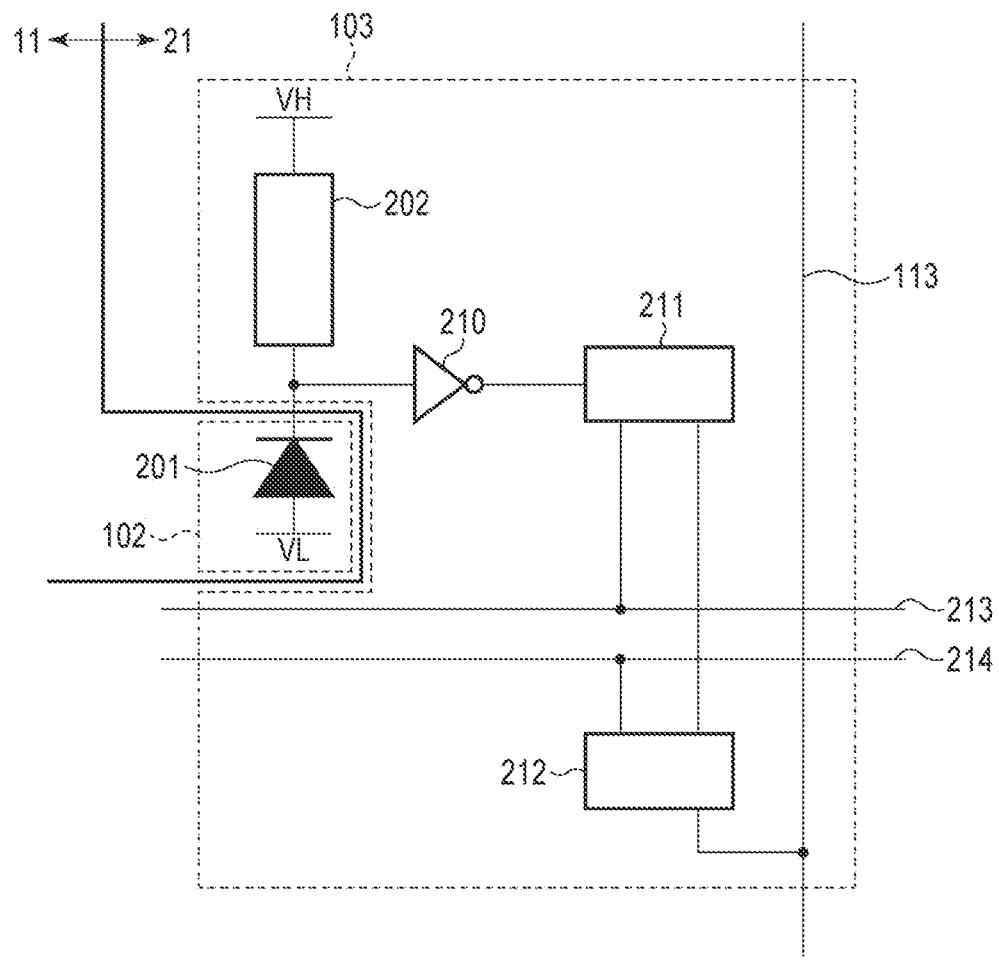
FIG. 28 is a schematic block diagram illustrating a configuration example of one pixel of a photoelectric conversion unit and a pixel signal processing unit according to the third embodiment.

FIG. 28 is a schematic block diagram illustrating a configuration example of one pixel of the photoelectric conversion unit 102 and the pixel signal processing unit 103 according to the present embodiment. FIG. 28 schematically illustrates a more specific configuration example including a connection relationship between the photoelectric conversion unit 102 arranged in the sensor substrate 11 and the pixel signal processing unit 103 arranged in the circuit substrate 21. In FIG. 28, driving lines between the vertical scanning circuit 110 and the pixel signal processing unit 103 in FIG. 27 are illustrated as driving lines 213 and 214.

The photoelectric conversion unit 102 includes an APD 201. The pixel signal processing unit 103 includes a quenching element 202, a waveform shaping unit 210, a counter circuit 211, and a selection circuit 212. The pixel signal processing unit 103 may include at least one of the waveform shaping unit 210, the counter circuit 211, and the selection circuit 212.

The APD 201 generates charge pairs corresponding to incident light by photoelectric conversion. A voltage VL (first voltage) is supplied to the anode of the APD 201. The cathode of the APD 201 is connected to a first terminal of the quenching element 202 and an input terminal of the waveform shaping unit 210. A voltage VH (second voltage) higher than the voltage VL supplied to the anode is supplied to the cathode of the APD 201. As a result, a reverse bias voltage that causes the APD 201 to perform the avalanche multiplication operation is supplied to the anode and the cathode of the APD 201. In the APD 201 to which the reverse bias voltage is supplied, when a charge is generated by the incident light, this charge causes avalanche multiplication, and an avalanche current is generated.

The operation modes in the case where a reverse bias voltage is supplied to the APD 201 include a Geiger mode and a linear mode. The Geiger mode is a mode in which a potential difference between the anode and the cathode is higher than a breakdown voltage, and the linear mode is a mode in which a potential difference between the anode and the cathode is near or lower than the breakdown voltage.

The APD operated in the Geiger mode is referred to as a single photon avalanche diode (SPAD). In this case, for example, the voltage VL (first voltage) is −30 V, and the voltage VH (second voltage) is 1 V. The APD 201 may operate in the linear mode or the Geiger mode. In the case of the SPAD, a potential difference becomes greater than that of the APD of the linear mode, and the effect of avalanche multiplication becomes significant, so that the SPAD is preferable.

The quenching element 202 functions as a load circuit (quenching circuit) when a signal is multiplied by avalanche multiplication. The quenching element 202 suppresses the voltage supplied to the APD 201 and suppresses the avalanche multiplication (quenching operation). Further, the quenching element 202 returns the voltage supplied to the APD 201 to the voltage VH by passing a current corresponding to the voltage drop due to the quenching operation (recharge operation). The quenching element 202 may be, for example, a resistive element.

The waveform shaping unit 210 shapes the potential change of the cathode of the APD 201 obtained at the time of photon detection, and outputs a pulse signal. For example, an inverter circuit is used as the waveform shaping unit 210. Although FIG. 28 illustrates an example in which one inverter is used as the waveform shaping unit 210, the waveform shaping unit 210 may be a circuit in which a plurality of inverters are connected in series, or may be another circuit having a waveform shaping effect.

The counter circuit 211 counts the pulse signals output from the waveform shaping unit 210, and holds a digital signal indicating the count value. When a control signal is supplied from the vertical scanning circuit 110 through the driving line 213, the counter circuit 211 resets the held signal.

The selection circuit 212 is supplied with a control signal from the vertical scanning circuit 110 illustrated in FIG. 27 through the driving line 214 illustrated in FIG. 28. In response to this control signal, the selection circuit 212 switches between the electrical connection and the non-connection of the counter circuit 211 and the pixel output signal line 113. The selection circuit 212 includes, for example, a buffer circuit or the like for outputting a signal corresponding to a value held in the counter circuit 211.

In the example of FIG. 28, the selection circuit 212 switches between the electrical connection and the non-connection of the counter circuit 211 and the pixel output signal line 113; however, the method of controlling the signal output to the pixel output signal line 113 is not limited thereto. For example, a switch such as a transistor may be arranged at a node such as between the quenching element 202 and the APD 201 or between the photoelectric conversion unit 102 and the pixel signal processing unit 103, and the signal output to the pixel output signal line 113 may be controlled by switching the electrical connection and the non-connection. Alternatively, the signal output to the pixel output signal line 113 may be controlled by changing the value of the voltage VH or the voltage VL supplied to the photoelectric conversion unit 102 using a switch such as a transistor.

FIG. 28 illustrates a configuration example using the counter circuit 211. However, instead of the counter circuit 211, a time-to-digital converter (TDC) and a memory may be used to acquire a timing at which a pulse is detected. In this case, the generation timing of the pulsed signal output from the waveform shaping unit 210 is converted into a digital signal by the TDC. In this case, a control signal (reference signal) can be supplied from the vertical scanning circuit 110 illustrated in FIG. 27 to the TDC via the driving line. The TDC acquires, as a digital signal, a signal indicating a relative time of input timing of a pulse with respect to the control signal.

Figure 29A:
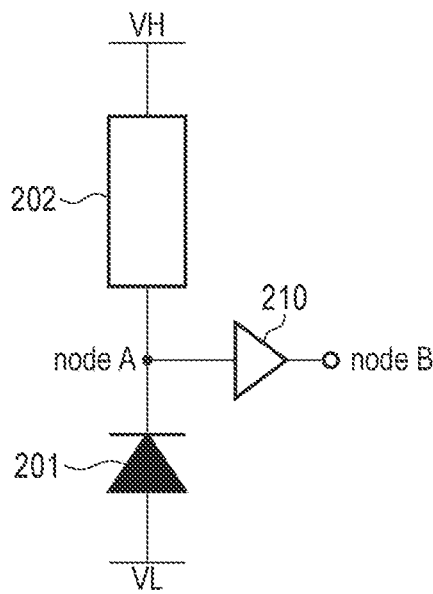
FIGS. 29A, 29B, and 29C are diagrams illustrating an operation of an avalanche photodiode according to the third embodiment.
Figure 29B:
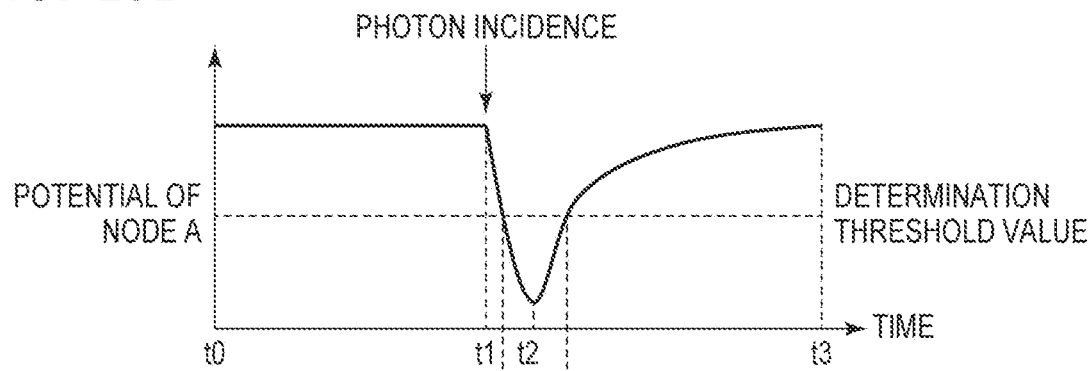
Figure 29C:
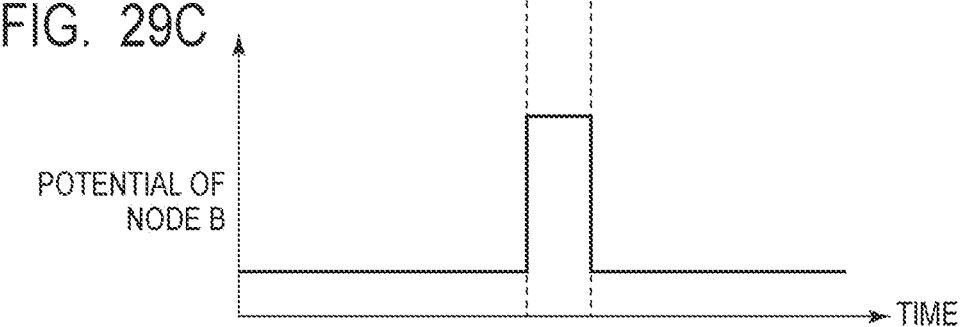

FIGS. 29A, 29B, and 29C are diagrams illustrating an operation of the APD 201 according to the present embodiment. FIG. 29A is a diagram illustrating the APD 201, the quenching element 202, and the waveform shaping unit 210 in FIG. 28. As illustrated in FIG. 29A, the connection node of the APD 201, the quenching element 202, and the input terminal of the waveform shaping unit 210 is referred to as node A. Further, as illustrated in FIG. 29A, an output side of the waveform shaping unit 210 is referred to as node B.

FIG. 29B is a graph illustrating a temporal change in the potential of node A in FIG. 29A. FIG. 29C is a graph illustrating a temporal change in the potential of node B in FIG. 29A. During a period from time t0 to time t1, the voltage VH-VL is applied to the APD 201 in FIG. 29A. When a photon enters the APD 201 at the time t1, avalanche multiplication occurs in the APD 201. As a result, an avalanche current flows through the quenching element 202, and the potential of the node A drops. Thereafter, the amount of potential drop further increases, and the voltage applied to the APD 201 gradually decreases. Then, at time t2, the avalanche multiplication in the APD 201 stops. Thereby, the voltage level of node A does not drop below a certain constant value. Then, during a period from the time t2 to time t3, a current that compensates for the voltage drop flows from the node of the voltage VH to the node A, and the node A is settled to the original potential at the time t3.

In the above-described process, the potential of node B becomes the high level in a period in which the potential of node A is lower than a certain threshold value. In this way, the waveform of the drop of the potential of the node A caused by the incidence of the photon is shaped by the waveform shaping unit 210 and output as a pulse to the node B.

The light receiving units 341a and 341b in the first or second embodiment correspond to, for example, the APD 201, the quenching element 202, and the waveform shaping unit 210 of the present embodiment.

According to the present embodiment, a photoelectric conversion device using an avalanche photodiode which can be applied to the ranging device 30 of the first or second embodiment is provided.

Fourth Embodiment

Figure 30:
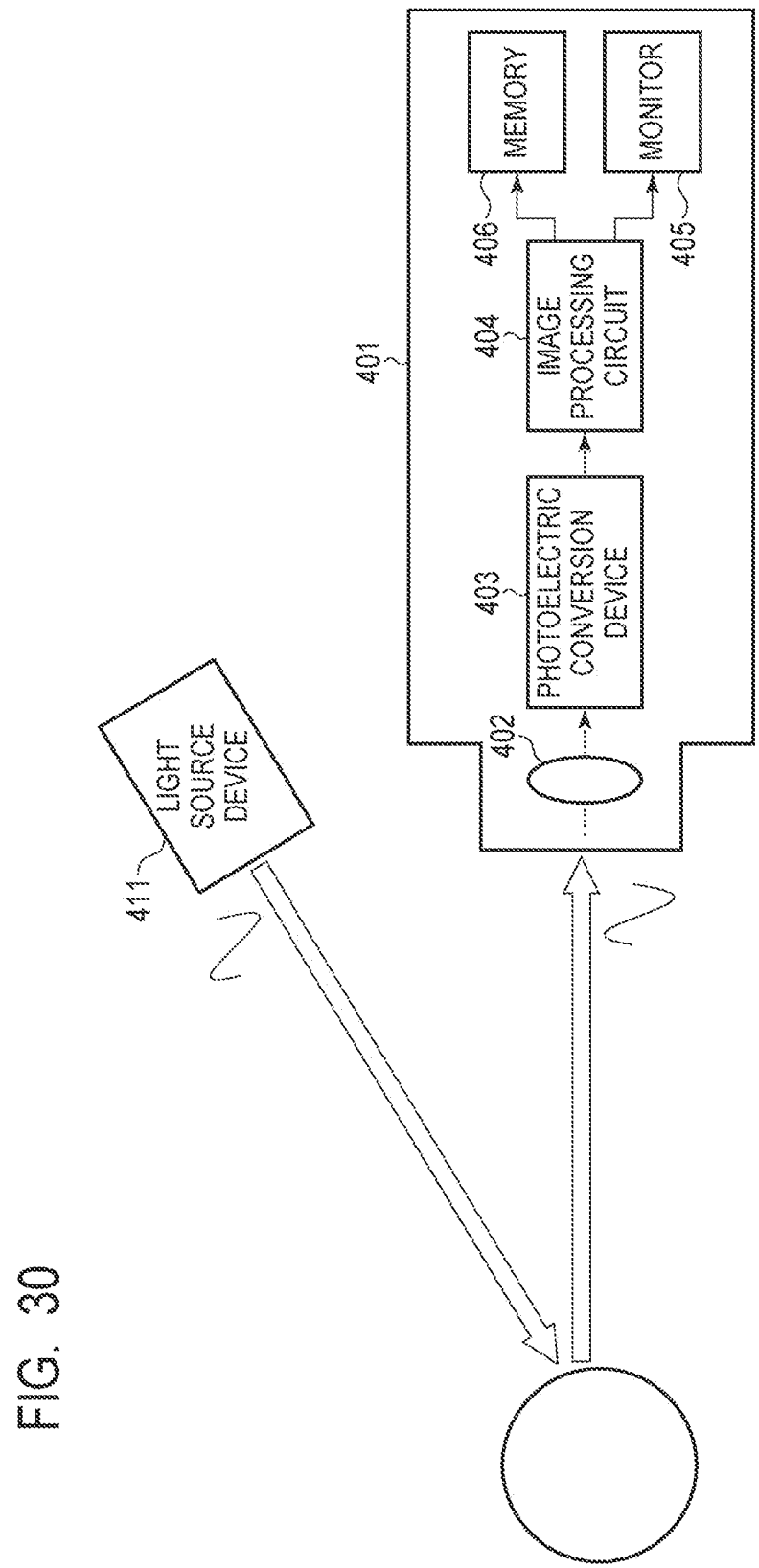
FIG. 30 is a schematic diagram of a photodetection system according to a fourth embodiment.

FIG. 30 is a block diagram of a photodetection system according to the present embodiment. More specifically, FIG. 30 is a block diagram of a distance image sensor and a light source device as an example of the ranging device 30 described in the above embodiments.

As illustrated in FIG. 30, the distance image sensor 401 includes an optical system 402, a photoelectric conversion device 403, an image processing circuit 404, a monitor 405, and a memory 406. The distance image sensor 401 receives light (modulated light or pulsed light) emitted from a light source device 411 toward an object and reflected by the surface of the object. The distance image sensor 401 can acquire a distance image corresponding to a distance to the object based on a time period from light emission to light reception. The light source device corresponds to the light emitting unit 32 of the above embodiments, and the photoelectric conversion device 403 corresponds to other blocks in the ranging device 30.

The optical system 402 includes one or a plurality of lenses, and guides image light (incident light) from the object to the photoelectric conversion device 403 to form an image on a light receiving surface (sensor portion) of the photoelectric conversion device 403.

The photoelectric conversion device 403 supplies a distance signal indicating a distance obtained from the received light signal to the image processing circuit 404. The image processing circuit 404 performs image processing for forming a distance image based on the distance signal supplied from the photoelectric conversion device 403. The distance image (image data) obtained by the image processing can be displayed on the monitor 405 and stored (recorded) in the memory 406.

The distance image sensor 401 configured in this manner can acquire an accurate distance image by applying the configuration of the above-described embodiments.

Fifth Embodiment

Figure 31A:
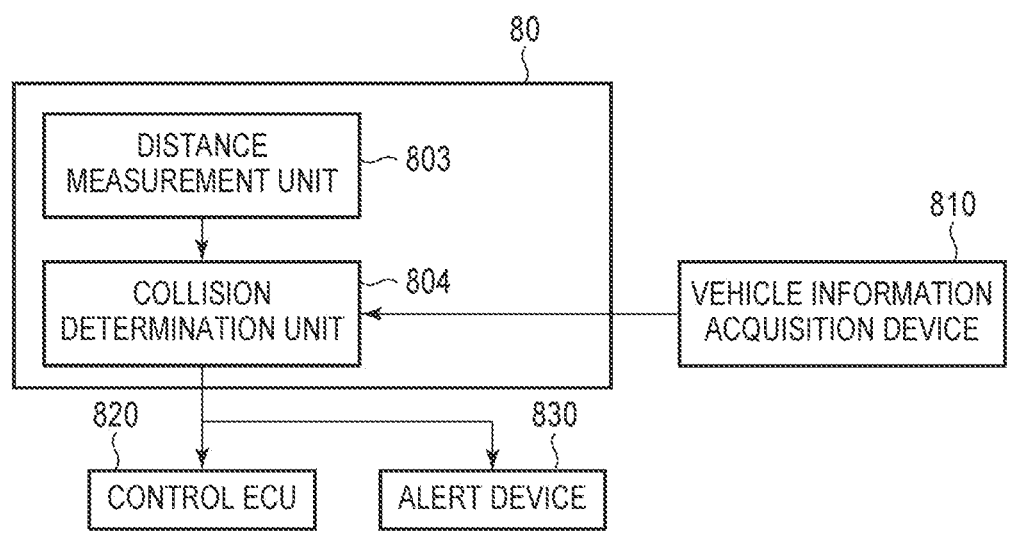
FIGS. 31A and 31B are schematic diagrams of equipment according to a fifth embodiment.
Figure 31B:
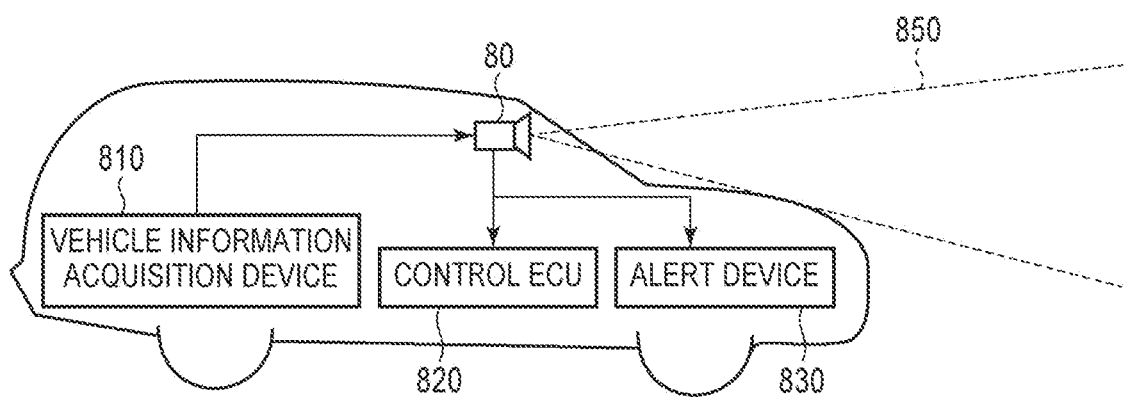

FIGS. 31A and 31B are block diagrams of equipment relating to an in-vehicle ranging device according to the present embodiment. Equipment 80 includes a distance measurement unit 803, which is an example of the ranging device of the above-described embodiments, and a signal processing device (processing device) that processes a signal from the distance measurement unit 803. The equipment 80 includes the distance measurement unit 803 that measures a distance to an object, and a collision determination unit 804 that determines whether or not there is a possibility of collision based on the measured distance. The distance measurement unit 803 is an example of a distance information acquisition unit that obtains distance information to the object. That is, the distance information is information on a distance to the object or the like. The collision determination unit 804 may determine the collision possibility using the distance information.

The equipment 80 is connected to a vehicle information acquisition device 810, and can obtain vehicle information such as a vehicle speed, a yaw rate, and a steering angle. Further, the equipment 80 is connected to a control ECU 820 which is a control device that outputs a control signal for generating a braking force to the vehicle based on the determination result of the collision determination unit 804. The equipment 80 is also connected to an alert device 830 that issues an alert to the driver based on the determination result of the collision determination unit 804. For example, when the collision possibility is high as the determination result of the collision determination unit 804, the control ECU 820 performs vehicle control to avoid collision or reduce damage by braking, returning an accelerator, suppressing engine output, or the like. The alert device 830 alerts the user by sounding an alarm, displaying alert information on a screen of a car navigation system or the like, or giving vibration to a seat belt or a steering wheel. These devices of the equipment 80 function as a movable body control unit that controls the operation of controlling the vehicle as described above.

In the present embodiment, ranging is performed in an area around the vehicle, for example, a front area or a rear area, by the equipment 80. FIG. 31B illustrates equipment when ranging is performed in the front area of the vehicle (ranging area 850). The vehicle information acquisition device 810 as a ranging control unit sends an instruction to the equipment 80 or the distance measurement unit 803 to perform the ranging operation. With such a configuration, the accuracy of distance measurement can be further improved.

Although the example of control for avoiding a collision to another vehicle has been described above, the embodiment is applicable to automatic driving control for following another vehicle, automatic driving control for not going out of a traffic lane, or the like. Furthermore, the equipment is not limited to a vehicle such as an automobile and can be applied to a movable body (movable apparatus) such as a ship, an airplane, a satellite, an industrial robot and a consumer use robot, or the like, for example. In addition, the equipment can be widely applied to equipment which utilizes object recognition or biometric authentication, such as an intelligent transportation system (ITS), a surveillance system, or the like without being limited to movable bodies.

Modified Embodiments

The present invention is not limited to the above embodiment, and various modifications are possible. For example, an example in which some of the configurations of any one of the embodiments are added to other embodiments and an example in which some of the configurations of any one of the embodiments are replaced with some of the configurations of other embodiments are also embodiments of the present invention.

The disclosure of this specification includes a complementary set of the concepts described in this specification. That is, for example, if a description of "A is B" (A=B) is provided in this specification, this specification is intended to disclose or suggest that "A is not B" even if a description of "A is not B" (A B) is omitted. This is because it is assumed that "A is not B" is considered when "A is B" is described.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-112260, filed Jul. 13, 2022, which is hereby incorporated by reference herein in its entirety.

What is claimed is:

1. A ranging device comprising:
a time counting unit configured to perform time counting;
a plurality of light receiving units each configured to generate a signal including a pulse based on incident light and perform an operation of counting the pulse;
a plurality of frequency distribution generation units arranged corresponding to the plurality of light receiving units and each configured to hold a frequency distribution including a light reception count value of the pulse acquired at predetermined time intervals in the time counting;
a binning processing unit configured to perform binning processing for one or more frequency distributions held in one or more frequency distribution generation units of the plurality of frequency distribution generation units;

a determination unit configured to determine whether a component of reflected light from an object is included in the frequency distribution subjected to the binning processing;

a binning setting unit configured to change the number of the frequency distribution generation units to be subjected to the binning processing performed by the binning processing unit in accordance with a result of the determination by the determination unit; and a distance calculation unit configured to calculate a distance to the object based on a time interval corresponding to a reception time of the reflected light when the determination unit determines that a component of the reflected light is included in the frequency distribution subjected to the binning processing.

2. The ranging device according to claim 1 further comprising:

a light emitting unit configured to emit light to the object; and a control unit configured to synchronously control a timing at which the light emitting unit emits light and a timing at which the time counting unit starts time counting.

3. The ranging device according to claim 1, wherein each of the plurality of light receiving units includes a plurality of photoelectric conversion elements and integrates to count pulses based on light incident on each of the plurality of photoelectric conversion elements.

4. The ranging device according to claim 1, wherein when the determination unit determines that a component of the reflected light is not included in the frequency distribution subjected to the binning processing, the binning setting unit increases the number of the frequency distribution generation units to be subjected to the binning processing by the binning processing unit.

5. The ranging device according to claim 4, wherein after the binning setting unit increases the number of the frequency distribution generation units to be subjected to the binning processing by the binning processing unit, the binning processing unit performs the binning processing again.

6. The ranging device according to claim 5, wherein the determination unit determines again whether a component of reflected light from the object is included in the frequency distribution subjected to the binning processing by the binning processing unit again.

7. The ranging device according to claim 1, wherein the determination unit determines that a component of the reflected light is included when a light reception count value at any one of a plurality of time intervals is larger than a threshold value.

8. The ranging device according to claim 7, wherein the threshold value is set for each of the plurality of time intervals and set to a smaller value as the elapsed time from the start of the time counting is longer.

9. The ranging device according to claim 8, wherein the threshold value is set to include a term inversely proportional to the square of the elapsed time for each of a plurality of time intervals.

10. The ranging device according to claim 1, wherein the binning setting unit sets a different number of frequency distribution generation units to be subjected to the binning processing by the binning processing unit between a part of the plurality of frequency distribution generation units and another part of the plurality of frequency distribution generation units.

11. The ranging device according to claim 1, wherein the distance calculation unit outputs information indicating that the distance cannot be calculated when the determination unit determines that a component of the reflected light is not included in the frequency distribution subjected to the binning processing and the number of the frequency distribution generation units subjected to the binning processing by the binning processing unit reaches a predetermined maximum value.

12. A photodetection system comprising:

the ranging device according to claim 1; and a signal processing unit configured to process a signal output from the ranging device.

13. A movable body comprising:

the ranging device according to claim 1; and a movable body control unit configured to control the movable body based on distance information acquired by the ranging device.

* * * * *